United States Patent
Hanaoka

(10) Patent No.: US 9,253,741 B2
(45) Date of Patent: Feb. 2, 2016

(54) WIRELESS COMMUNICATION SYSTEM, TERMINAL DEVICE, AND BASE STATION DEVICE

(75) Inventor: Seishi Hanaoka, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 147 days.

(21) Appl. No.: 14/126,701

(22) PCT Filed: Jun. 15, 2012

(86) PCT No.: PCT/JP2012/065374
§ 371 (c)(1),
(2), (4) Date: Mar. 14, 2014

(87) PCT Pub. No.: WO2012/173231
PCT Pub. Date: Dec. 20, 2012

(65) Prior Publication Data
US 2014/0248921 A1 Sep. 4, 2014

(30) Foreign Application Priority Data
Jun. 17, 2011 (JP) .................................. 2011-135045

(51) Int. Cl.
*H04W 52/00* (2009.01)
*H04W 52/38* (2009.01)
(Continued)

(52) U.S. Cl.
CPC .............. *H04W 52/38* (2013.01); *H04W 16/14* (2013.01); *H04W 52/243* (2013.01); *H04W 52/283* (2013.01); *H04W 52/322* (2013.01); *H04B 7/0617* (2013.01); *H04W 52/143* (2013.01)

(58) Field of Classification Search
CPC .............................. H04W 52/38; H04W 16/14
USPC .......... 455/522, 69, 452.1, 452.2, 509, 456.1, 455/67.11, 456.3
See application file for complete search history.

(56) References Cited

U.S. PATENT DOCUMENTS 5,881,368 A * 3/1999 Grob et al. ....................... 455/69
6,650,876 B1   11/2003 Ostman et al.
(Continued)

FOREIGN PATENT DOCUMENTS

| JP | 2003-507956 A | 2/2003 |
| JP | 2007-214819 A | 8/2007 |
| JP | 2010-178225 A | 8/2010 |

OTHER PUBLICATIONS

IEEE, "Draft Standard for Wireless Regional Area Networks Part 22: Cognitive Wireless RAN Medium Access Control (MAC) and Physical Layer (PHY) specifications: Policies and procedures for operation in TV Bands", IEEE 802.22/P802.22/D3.0, Mar. 2011, p. i-655.

*Primary Examiner* — John J Lee
(74) *Attorney, Agent, or Firm* — Volpe and Koenig, P.C.

(57) ABSTRACT

It is provided a wireless communication system, which secondarily uses the same frequency as a primary system using, the wireless communication system comprising a mobile terminal and a base station. The mobile terminal detects a signal having the frequency; and requests, in a case where a broadcast signal transmitted from the base station is undetectable, the base station to increase a transmission power to a range that a signal does not reach a service area of the primary system, based on a location of a wireless transmitter of the primary system, a location of the base station of the wireless communication system, and a location of the mobile terminal of the wireless communication system. The base station increases the transmission power to the range that the signal does not reach the service area of the primary system in case of receiving the request to increase the transmission power.

20 Claims, 26 Drawing Sheets

(51) Int. Cl.
*H04W 16/14* (2009.01)
*H04W 52/28* (2009.01)
*H04W 52/24* (2009.01)
*H04W 52/32* (2009.01)
*H04W 52/14* (2009.01)
*H04B 7/06* (2006.01)

(56) References Cited

U.S. PATENT DOCUMENTS 8,229,489 B1 * 7/2012 Klein et al. .................. 455/522
2007/0183392 A1   8/2007 Tandai et al.
2014/0120928 A1 * 5/2014 Dimou ...................... 455/452.1

* cited by examiner

| FREQ. | PRIMARY SYSTEM OPERATOR | TRANSMITTER LOCATION (LATITUDE, LONGITUDE) | TX POWER (WATT) | ANTENNA PATTERN | PRIMARY SYSTEM SENSITIVITY (dBm) |
|---|---|---|---|---|---|
| Ch 1 | PA | ( LA_A, LO_A ) | 10 | PATTERN A | AAA |
| Ch 2 | --- | | | | |
| Ch 3 | PB | ( LA_B, LO_B ) | 4 | PATTERN B | BBB |
| Ch 4 | PB | ( LA_C, LO_C ) | 4 | PATTERN C | BBB |
| ... | | | | | |

| SECONDARY SYSTEM OPERATOR | SYSTEM TYPE | BS LOCATION (LATITUDE, LONGITUDE) | TX POWER (WATT) | ANTENNA PATTERN | SECONDARY SYSTEM SENSITIVITY (dBm) |
|---|---|---|---|---|---|
| SA | 802.11af | ( LA_D, LO_D ) | 4 | PATTERN A | DDD |
| SB | 802.22 | ( LA_E, LO_E ) | 0.4 | PATTERN D | EEE |
| SB | 802.22 | ( LA_F, LO_F ) | 0.4 | PATTERN B | EEE |
| | | | | | |

EXAMPLE: PATTERN A

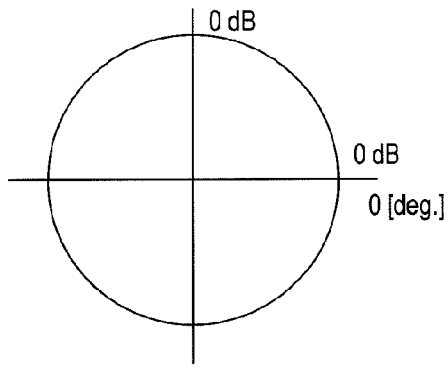

| DEGREE | GAIN |
|---|---|
| 0 | 0 [dB] |
| 10 | 0 [dB] |
| ... | 0 [dB] |
| 350 | 0 [dB] |

EXAMPLE: PATTERN B

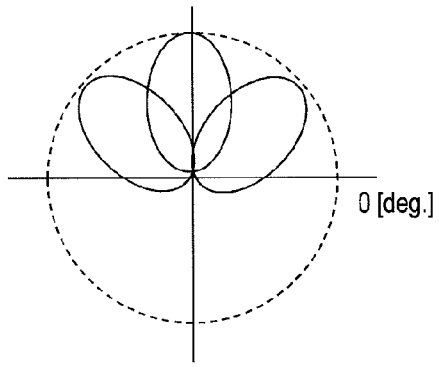

| DEGREE | GAIN |
|---|---|
| 0 | -6.0 [dB] |
| 10 | -3.0 [dB] |
| ... | XXX [dB] |
| 350 | YYY [dB] |

*FIG. 3*

706, 2505
| FREQ. | PRIMARY SYSTEM OPERATOR | TRANSMITTER LOCATION (LATITUDE, LONGITUDE) | TX POWER (WATT) | ANTENNA PATTERN | PRIMARY SYSTEM SENSITIVITY (dBm) |
|---|---|---|---|---|---|
| Ch 1 | A | ( LA_A, LO_A ) | 10 | PATTERN A | AAA |
| Ch 2 | --- | | | | |
| Ch 3 | B | ( LA_B, LO_B ) | 4 | PATTERN B | BBB |
| Ch 4 | B | ( LA_C, LO_C ) | 4 | PATTERN C | CCC |
| ... | | | | | |
EXAMPLE: PATTERN A
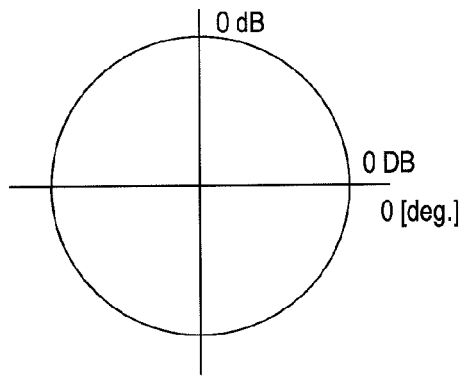
| DEGREE | GAIN |
|---|---|
| 0 | 0 [dB] |
| 10 | 0 [dB] |
| 20 | 0 [dB] |
| ... | 0 [dB] |
| 350 | 0 [dB] |
EXAMPLE: PATTERN B
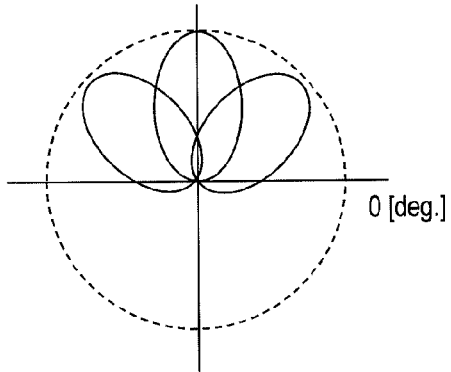
| DEGREE | GAIN |
|---|---|
| 0 | -6.0 [dB] |
| 10 | -3.0 [dB] |
| 20 | -0.1 [dB] |
| ... | XXX [dB] |
| 350 | YYY [dB] |
*FIG. 6*

| LOCATION (LATITUDE, LONGITUDE) | FREQ. | PROTECTED | RECEIVED POWER | OCCUPIED |
|---|---|---|---|---|
| ( LA_X1, LO_X1) | 410-411 | ✓ | AAA (dBm) | --- |
|  | 411-412 | --- | BBB (dBm) | ✓ |
|  | 412-413 | --- | CCC (dBm) | ✓ |
|  | 413-414 | --- | DDD (dBm) | --- |
|  | ... |  |  |  |
| ( LA_X2, LO_X2) | 410-411 | ✓ | DDD (dBm) | --- |
|  | 411-412 | --- | EEE (dBm) | --- |
|  | 412-413 | --- | FFF (dBm) | --- |
|  | 413-414 | --- | GGG (dBm) | --- |
|  | ... |  |  |  |
| ( LA_X3, LO_X3) | 410-411 | ✓ | AAA (dBm) | --- |
| ... | ... |  |  |  |
| ... | ... |  |  |  |

FIG. 7

| | CPE CAN RECEIVE TVWS BROADCAST SIGNAL | CPE CANNOT RECEIVE TVWS BROADCAST SIGNAL |
|---|---|---|
| ds < (d2 - d1) | CASE 1 | CASE 2 |
| ds ≧ (d2 - d1) | CASE 3 | CASE 4 |

WIRELESS COMMUNICATION SYSTEM, TERMINAL DEVICE, AND BASE STATION DEVICE

CLAIM OF PRIORITY

The present application claims priority from Japanese patent application JP 2011-135045 filed on Jun. 17, 2011, the content of which is hereby incorporated by reference into this application.

BACKGROUND OF THE INVENTION

This invention relates to a wireless communication system, and more particularly, to a wireless communication system in which the same frequency as that of a primary system is used secondarily.

Generally speaking, a white space is a frequency band that is within a frequency band for which a wireless system given priority in using a frequency in question (a primary system) is defined in the Radiocommunication Sector, International Telecommunication Union (ITU-R) or the like, and that is not used by the primary system in terms of time or area. Studies for making effective use of white spaces are being conducted due to the shortage of frequencies suitable for wireless communication which results from the popularization of cellular phones and increased traffic.

Of this kind of frequency bands, a white space centered around a TV band is a TV white space. In other words, a TV white space is a frequency band that is within one of the VHF band and the UHF band, which are allocated to terrestrial TV broadcasting, and that is not used for TV broadcasting in terms of time or area. Sharing frequencies in this frequency band between a business operator who broadcasts a TV program and the like in this frequency band (a primary user) and other business operators or individuals (secondary users) on the condition that the use of the primary user be not affected is being discussed.

One of the standardization activities that take the above-mentioned movement into consideration is IEEE 802.22. IEEE 802.22 is targeted for Wireless Regional Area Networks (WRANs) that utilize TV white spaces. The UHF frequency band (470 MHz to 710 MHz) for TV is a frequency band lower than frequencies that are used by cellular phones (the 800 MHz band and the 2 GHz band), and its radio waves have a property of reaching far and wide. IEEE 802.22 therefore assumes the coverage of a single base station to be 20 km to 30 km. Of the layers of the Open Systems Interconnection (OSI) reference 7-layer model, IEEE 802.22 standardizes the physical layer and the Media Access Control (MAC) layer.

FIG. 21 illustrates the configuration of a wireless communication system which conforms to the draft specifications of IEEE 802.22.

A base station (BS) 101 and a customer premise equipment (CPE) 102 are coupled by a wireless method defined in IEEE 802.22, and the base station 101 is coupled to a network (for example, IP network) 103 via a cable line. In order to run this IEEE 802.22 system, a network control system 104, a network management system 105, and a database service 106 are coupled via the network 103. IEEE 802.22, which mainly defines the physical layer and the MAC layer between the base station 101 and the customer premise equipment 102, does not regulate the specifications of an interface to an external system or service that is coupled via the network 103.

Applying IEEE 802.22 to a TV frequency band in this case means that a TV broadcasting which is a primary system and the IEEE 802.22 system which is a secondary system share the frequency band, and inherently causes the "hidden node problem".

The "hidden node problem" is described with reference to FIGS. 22(a) and 22(b). A TV signal transmitted from a TV station 201 reaches a TV receiver 202, with attenuation an amount of which is in relation to the distance. A receiving sensitivity necessary to receive a TV signal and displays video and the like is set to the TV receiver. A TV program can be viewed on the TV receiver in a case where the receiving power is equal to or more than the receiving sensitivity, and cannot be viewed in a case where the receiving power is less than the receiving sensitivity. FIG. 22(a) illustrates a state where the receiving power is equal to or more than the receiving sensitivity at the TV receiver 202, which is located at a distance from the TV station, and a TV program can therefore be viewed on the TV receiver 202 (204).

The IEEE 802.22 system is allowed to run as long as its operation does not affect the TV broadcasting which is the primary system. An IEEE 802.22 base station/customer premise equipment (BS/CPE) 203 therefore executes sensing of radio waves of TV broadcasting. In sensing, the IEEE 802.22 system needs to be capable of detecting a TV signal at a sensitivity higher than that of the TV receiver 202 (a TV signal of a lower receiving power). FIG. 22(a) illustrates an example in which the IEEE 802.22 base station/customer premise equipment 203 is located even farther than the TV receiver 202 from the TV station. A signal detected at the location of the IEEE 802.22 base station/customer premise equipment 203 in this case has a lower receiving power than the power at which a TV program can be viewed on the TV receiver 202 (205). Then it is determined that this frequency is not in use at the location of the IEEE 802.22 base station/customer premise equipment, and the frequency is used for communication between the IEEE 802.22 base station and the IEEE 802.22 customer premise equipment.

The IEEE 802.22 base station/customer premise equipment 203 consequently uses the same frequency as that of TV broadcasting to send out radio waves as illustrated in FIG. 22(b) (206). The IEEE 802.22 base station/customer premise equipment 203 at this point is not aware of the existence of the TV receiver 202, which is simply receiving radio waves from the TV station 201. As a result, the TV receiver 202 receives an unwanted IEEE 802.22 signal at a power higher than that of the wanted TV broadcasting signal (207). Interference from the unwanted IEEE 802.22 signal hinders the viewing of a TV program, which constitutes the "hidden node problem". The TV receiver 202 is just a receiver and does not transmit radio waves of its own. The IEEE 802.22 base station/customer premise equipment 203 therefore cannot detect the TV receiver 202.

IEEE 802.22 is accordingly designed so that a TV white space network service area 303 does not overlap a TV broadcasting service area 301 by providing a keep out region 302 outside the TV broadcasting service area 301 and setting up a base station (101) outside the keep out region 302.

A procedure that the customer premise equipment 102 follows in order to couple to an IEEE 802.22 network is described next. FIG. 24 is a flowchart illustrating a procedure through which the customer premise equipment 102 couples to an IEEE 802.22 network.

The customer premise equipment 102 first conducts a self test (401) and then obtains antenna gain information (402). The customer premise equipment 102 next executes sensing for detecting a TV signal 403, or a signal 404 broadcast at a TV frequency in question from an IEEE 802.22 or a similar system (a WRAN broadcast signal) (405). Based on the result of the sensing 405, the customer premise equipment 102 chooses a WRAN network to which the customer premise equipment 102 is to be coupled (WRAN selection) (406). A GPS receiver of the customer premise equipment 102 obtains its own location (geolocation data acquisition) (407). The customer premise equipment 102 determines whether or not its own location has successfully been obtained ("Success?") (408). In a case where succeeding in obtaining its own location, the customer premise equipment 102 obtains WRAN parameters, which are information for coupling to the base station 101 (for example, time information), from the WRAN broadcast signal 404 broadcast from the network side (WRAN parameters acquisition) (409). The customer premise equipment 102 adjusts the antenna azimuth (antenna azimuth adjustment) (410), and then transmits radio waves to the base station 101 in an attempt to couple to the base station 101 (initial ranging) (411). Thereafter, an authentication process for determining whether or not the customer premise equipment 102 is a legitimate node (an AAA authentication process) (412), and whether or not the customer premise equipment 102 has been authenticated successfully is determined ("Success?") (413). In a case where the customer premise equipment 102 is authenticated successfully, registration is executed (414), and IP connectivity between the customer premise equipment 102 and the base station 101 is established (IP connectivity establishment) (415).

In the case where the customer premise equipment 102 is set up stationarily in the IEEE 802.22 system, in other words, in a case where the customer premise equipment 102 does not move from a setup location which can be known in advance, the customer premise equipment can be set up within the TV white space network service area 303 of FIG. 23. In the case where the customer premise equipment 102 is portable equipment and the place of its use can be moved, on the other hand, the customer premise equipment 102 may move out of the TV white space network service area 303 at the will of the user.

This problem is described with reference to drawings. In the case where the customer premise equipment 102 is set up outside the TV white space network service area 303, for example, as illustrated in FIG. 25, increasing the transmission power (Tx power) of the base station 101 in order to deliver the broadcast signal to the location of the customer premise equipment 102 expands the TV white space network service area (901). This creates an area 902 which overlaps the TV broadcasting service area. Interference affects a TV receiver that receives TV broadcasting inside the area 902, and gives rise to a problem of deteriorated TV reception quality.

Another example is described with reference to FIG. 26. In the case where the customer premise equipment 102 communicates a signal to the base station 101 at a Tx power enough to reach the base station 101 from the location of the customer premise equipment 102, an area 1002 is created, where a region 1001 at which a signal transmitted from the customer premise equipment 102 arrives overlaps the TV broadcasting service area 301. Interference affects a TV receiver that receives TV broadcasting inside the area 1002, and gives rise to a problem of deteriorated TV reception quality.

In the network coupling procedure of IEEE 802.22, where a WRAN network to which the customer premise equipment is to be coupled is chosen (406) based on the result of sensing (405) as illustrated in FIG. 24, WRAN system selection cannot be executed in a case where the customer premise equipment 102 moves out of a WRAN service area and cannot receive a WRAN broadcast signal. IEEE 802.22 does not define the case where the customer premise equipment 102 cannot select a WRAN system and, in this case, the customer premise equipment cannot follow the subsequent steps of the flow and cannot couple to a network.

SUMMARY OF THE INVENTION

An object of this invention is therefore to expand a WRAN service area more than usual to the range that the TV broadcasting service area is not affected.

The representative one of inventions disclosed in this application is outlined as follows. There is provided a wireless communication system, which secondarily uses the same frequency as a primary system that uses a certain frequency, the wireless communication system comprising a mobile terminal and a base station. The mobile terminal detects a signal having the frequency; and requests, in a case where a broadcast signal transmitted from the base station is undetectable, the base station to increase a transmission power to a range that a signal does not reach a service area of the primary system, based on a location of a wireless transmitter of the primary system, a location of the base station of the wireless communication system, and a location of the mobile terminal of the wireless communication system. The base station increases the transmission power to the range that the signal does not reach the service area of the primary system in case of receiving the request to increase the transmission power.

According to one embodiment of this invention, a WRAN service area can be expanded more than usual to the range that the TV broadcasting service area is not affected.

BRIEF DESCRIPTION OF THE DRAWINGS

The present invention can be appreciated by the description which follows in conjunction with the following figures, wherein:

FIG. 3 is an explanatory diagram illustrating a configuration of a location database of the first embodiment;

FIG. 6 is an explanatory diagram illustrating a configuration of a primary system location/power information database and primary system antenna pattern information of the first embodiment;

FIG. 7 is a diagram illustrating a configuration of a white space sensing database of the first embodiment;

DETAILED DESCRIPTION OF THE PREFERRED EMBODIMENTS

First Embodiment

A first embodiment of this invention is described.

Figure 1:
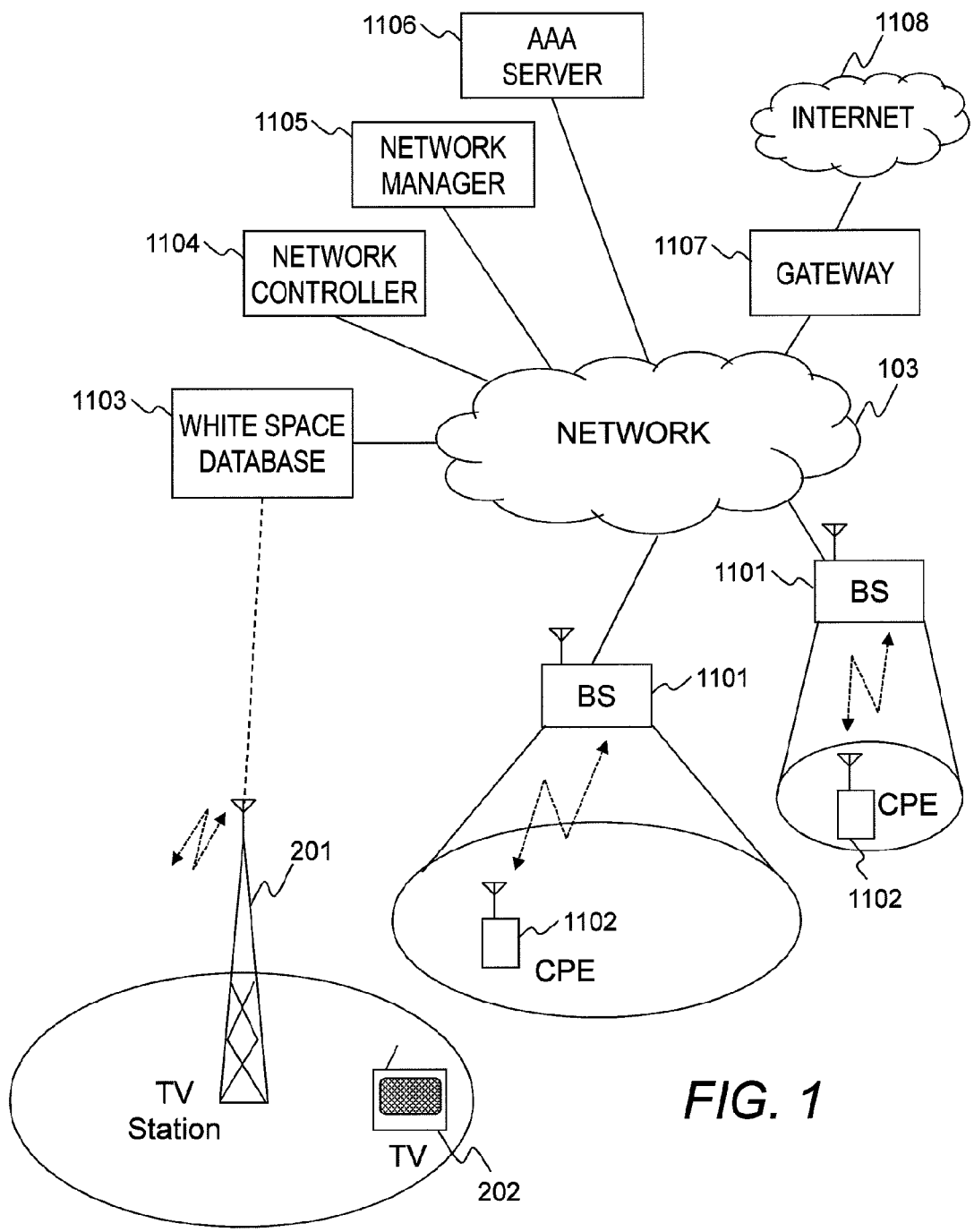
FIG. 1 is a diagram illustrating a configuration of a wireless communication system of a first embodiment.

FIG. 1 is a diagram illustrating the configuration of a wireless communication system of the first embodiment.

The wireless communication system of the first embodiment includes a WRAN base station (BS) 1101, a WRAN customer premise equipment (CPE) 1102, and a white space database 1103. These components are coupled via a network 103.

The wireless communication system of the first embodiment also includes a network controller 1104, a network manager 1105, an AAA server 1106, and a gateway 1107, which are coupled via the network 103. These components enable the WRAN customer premise equipment 1102 to hold communication to/from another network.

A TV station 201 is provided in the neighborhood of the wireless communication system of the first embodiment, and radio waves transmitted from the TV station 201 are received by a TV receiver 202. The TV station 201 and the TV receiver 202 are an existing facility and device, and the same as conventional ones in this embodiment, too.

The network controller 1104 is the same as conventional one and is installed in a network controller as an entity. The network manager 1105 is the same as conventional one and is installed in a network manager as an entity. The AAA server 1106 executes an authentication process regarding whether or not the node in question is the legitimate WRAN customer premise equipment 1102. The gateway 1107 couples the communication system of this embodiment to another network (for example, the Internet which is denoted by 1108).

Figure 2:
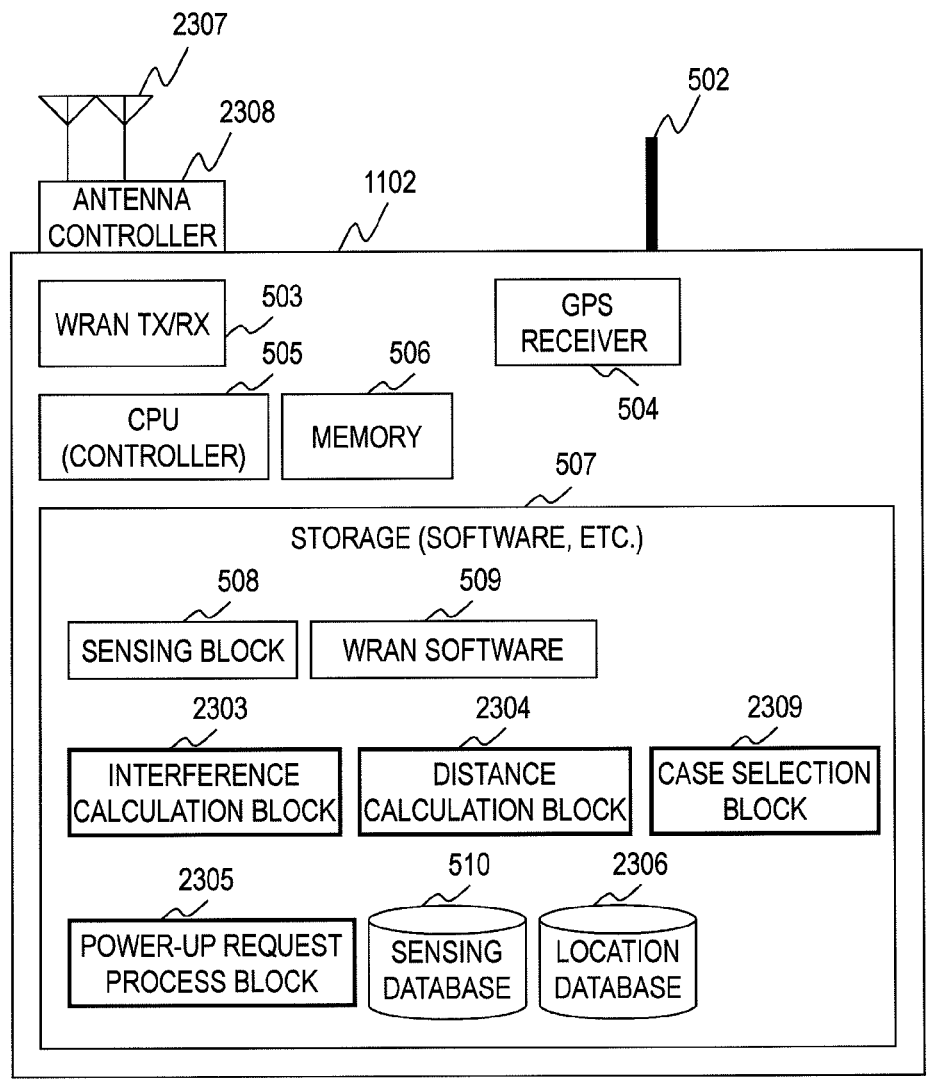
FIG. 2 is a block diagram illustrating a configuration of a WRAN customer premise equipment of the first embodiment.

FIG. 2 is a block diagram illustrating the configuration of the WRAN customer premise equipment 1102 of the first embodiment.

The WRAN customer premise equipment 1102 of this embodiment includes, in the form of hardware, a WRAN antenna 2307, an antenna controller 2308, a WRAN Tx/Rx 503, a GPS antenna 502, a GPS receiver 504, a CPU 505, a memory 506, and storage 507.

The WRAN antenna 2307 is an antenna compliant with a wireless method of WRAN and that can be controlled in directivity. The antenna controller 2308 controls the directivity of the WRAN antenna 2307. To control the directivity of the WRAN antenna 2307, the antenna pattern may be controlled by building the WRAN antenna 2307 from an array antenna and changing the signal level and phase of each element, or by building the WRAN antenna 2307 from a directional antenna and physically turning the tilt angle and direction of the directional antenna.

The WRAN Tx/Rx 503 transmits and receives WRAN wireless signals.

The GPS receiver 504 receives a signal from a GPS satellite that is caught by the GPS antenna 502, and outputs the location (latitude, longitude, and altitude) of the WRAN customer premise equipment 1102.

The CPU 505 loads programs stored in the storage 507 onto the memory 506, and executes the loaded programs. By executing these programs, the CPU 505 functions as a controller for controlling the operation of the WRAN customer premise equipment 1102.

The storage 507 is non-volatile storage such as a magnetic disk drive or a non-volatile semiconductor memory, and stores programs to be executed by the CPU 505. The programs stored in the storage 507 are specifically a sensing block 508, WRAN software 509, an interference calculation block 2303, a distance calculation block 2304, a power-up request process block 2305, and a case selection block 2309.

The sensing block implemented by the program 508 executes sensing of a frequency that is not in use. The WRAN software 509 provides functions necessary for the operation of the WRAN.

The interference calculation block implemented by the program 2303 calculates, in Case 3 and Case 4 which are described later, whether radio waves transmitted from the WRAN customer premise equipment 1102 affect a TV broadcasting service area.

The distance calculation block implemented by the program 2304 performs a calculation for grasping the positional relation of the WRAN customer premise equipment 1102, the TV station 201, and the WRAN base station 1101. Specifically, the distance calculation block calculates a distance d1 between the TV station 201 and the farthest point where TV broadcasting can be received, a distance d2 between the TV station 201 and the WRAN customer premise equipment 1102, and a distance ds between the WRAN base station 1101 and the WRAN customer premise equipment 1102.

The power-up request process block implemented by the program 2305 generates, in Case 2 and Case 4 which are described later, a signal for requesting the WRAN base station 1101 to increase the power of a signal transmitted from the WRAN base station 1101. The case selection block implemented by the program 2309 selects a case based on the distances d1, d2, and ds calculated by the distance calculation block, with the use of a table 1301 (see FIG. 9) for determining conditions.

The storage 507 further stores a sensing database 510 and a location database 2306.

The sensing database 510 is a database for holding results of sensing executed by the sensing block (program 508). The location database 2306 is a database for holding information about the location and Tx power of the TV station 201, the receiving sensitivity of the TV receiver, the location and Tx power of the WRAN base station 1101, and the receiving sensitivity of the WRAN receiver. Details of the location database 2306 are described later with reference to FIG. 3. The location database 2306 is used when the distance calculation block (program 2304) calculates the distances.

These programs and data, which are stored in the storage 507 in the drawing, are actually loaded onto the memory 506 as the need arises to be executed or used by the CPU 505 as described above. These programs and data may be stored in the memory 506 instead.

FIG. 3 is an explanatory diagram illustrating the configuration of the location database 2306.

The location database 2306 includes, for each frequency (freq.), information about a business operator of a primary system (a primary system operator), the location of the TV station 201 (a transmitter location) (for example, the latitude and longitude), the transmission power (Tx power) of the TV station 201, the antenna directivity (antenna pattern) of the TV station 201, and the receiving sensitivity of the TV station's broadcasting service (primary system sensitivity).

The location database 2306 also includes information about a business operator of a secondary system (a secondary system operator), a system type, the location of the WRAN base station 1101 (a BS location) (for example, the latitude and longitude), the transmission power (Tx power) of the WRAN base station 1101, the antenna directivity (antenna pattern) of the WRAN base station 1101, and the receiving sensitivity of the WRAN system in question (secondary system sensitivity).

The location database 2306 further includes antenna gain data for each angle of each antenna pattern.

Figure 4:
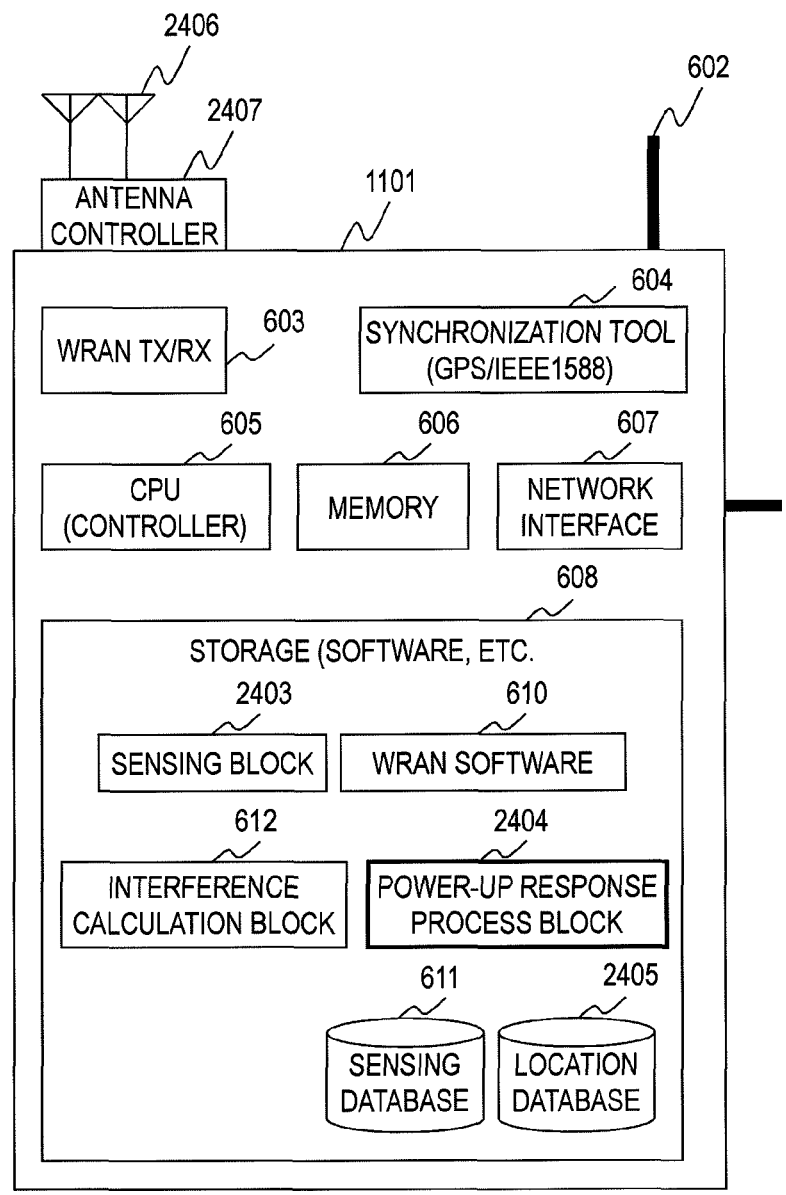
FIG. 4 is a block diagram illustrating a configuration of a WRAN base station of the first embodiment.

FIG. 4 is a block diagram illustrating the configuration of the WRAN base station 1101 of the first embodiment.

The WRAN base station 1101 of this embodiment includes, in the form of hardware, a WRAN antenna 2406, an antenna controller 2407, a WRAN Tx/Rx 603, a GPS antenna 602, a synchronization tool 604, a CPU 605, a memory 606, a network interface 607, and storage 608.

The WRAN antenna 2406 is an antenna that is compliant with a wireless method of WRAN and that can be controlled in directivity. The antenna controller 2407 controls the directivity of the WRAN antenna 2406. To control the directivity of the WRAN antenna 2406, the antenna pattern may be controlled by building the WRAN antenna 2406 from an array antenna and changing the signal level and phase of each element, or by building the WRAN antenna 2406 from a directional antenna and physically turning the tilt angle and direction of the directional antenna.

The WRAN Tx/Rx 603 transmits and receives WRAN wireless signals.

The synchronization tool 604 includes a GPS receiver for receiving a signal from a GPS satellite that is caught by the GPS antenna 602, and for outputting time information. The WRAN base station 1101 may also be synchronized with another base station through communication via the interface 607 that uses, for example, IEEE 1588.

The CPU 605 loads programs stored in the storage 608 onto the memory 606, and executes the loaded programs. By executing these programs, the CPU 605 functions as a controller for controlling the operation of the WRAN base station 1101.

The network interface 607 holds communication to/from another base station with the use of, for example, the TCP/IP protocol, in order to establish synchronization between the base stations.

The storage 608 is non-volatile storage such as a magnetic disk drive or a non-volatile semiconductor memory, and stores programs to be executed by the CPU 605. The programs stored in the storage 608 are specifically a sensing block 2403, WRAN software 610, an interference calculation block 612, and a power-up response process block 2404.

The sensing block implemented by the program 2403 detects, in Case 2 and Case 4 which are described later, a power-up request signal transmitted from the WRAN customer premise equipment 1102. The WRAN software 610 provides functions necessary for the base station-side operation of the WRAN.

The interference calculation block implemented by the program 612 calculates whether radio waves transmitted from the WRAN base station 1101 affect the TV system.

The power-up response process block implemented by the program 2404 responds to a power-up request from the WRAN customer premise equipment 1102 by controlling a signal transmitted from the WRAN base station 1101 so that the power of the signal increases.

The storage 608 further stores a sensing database 611 and a location database 2405.

The sensing database 611 is a database for holding results of sensing executed by the sensing block (program 2403). The location database 2405 is a database for holding information about the location and Tx power of the TV station 201, the receiving sensitivity of the TV receiver, the location and Tx power of the WRAN base station 1101, and the receiving sensitivity of the WRAN receiver. The location database 2405 is used when the distance calculation block (program 2304) calculates the distances.

These programs and data, which are stored in the storage 608 in the drawing, are actually loaded onto the memory 606 as the need arises to be executed or used by the CPU 605 as described above. These programs and data may be stored in the memory 606 instead.

Figure 5:
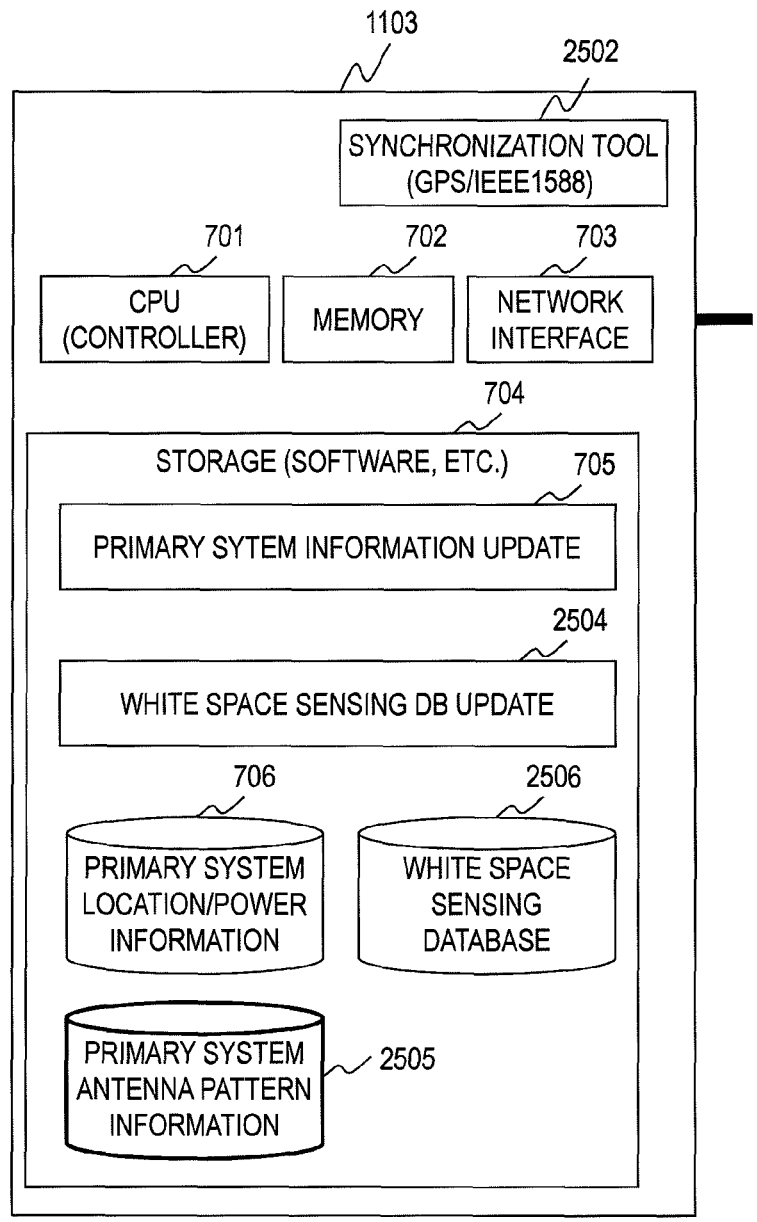
FIG. 5 is a block diagram illustrating a configuration of a white space database of the first embodiment.

FIG. 5 is a block diagram illustrating the configuration of the white space database 1103 of the first embodiment.

The white space database 1103 of this embodiment includes, in the form of hardware, a CPU 701, a memory 702, a network interface 703, storage 704, and a synchronization tool 2502.

The CPU 701 loads programs stored in the storage 704 onto the memory 702, and executes the loaded programs. By executing these programs, the CPU 701 functions as a controller for controlling the operation of the white space database 1103.

The network interface 703 couples to the network 103 and holds communication that uses, for example, the TCP/IP protocol, in order to establish synchronization with another node in the system. The synchronization tool 2502 holds communication via the interface 703 with the use of, for example, IEEE 1588, to thereby synchronize with another node in the system.

The storage 704 is non-volatile storage such as a magnetic disk drive or a non-volatile semiconductor memory, and stores a primary system information update 705 and a white space sensing database update 2504, which are programs for updating databases.

The updater implemented by the program 705 updates a database 706 and a database 2506 periodically, or in a case where there is a change to the environment. The updater implemented by the program 2504 updates a database 2505.

The storage 704 further stores the database 706 for holding information of the primary system (primary system location/power information), the database 2505 which is about the antenna directivity of the primary system (primary system antenna pattern information), and the database 2506 which is a white space sensing database.

The primary system location/power information 706 is a database for holding information about a frequency that the primary system is given priority to use, a frequency that the secondary system is prohibited from using, the transmission station location of the primary system, and the Tx power of the primary system. The primary system antenna pattern information 2505 is a database for holding information about the antenna pattern of the broadcast station of the primary system. Details of the primary system location/power information 706 and the primary system antenna pattern information 2505 are described later with reference to FIG. 6.

The white space sensing database 2506 is a database for holding, for each location and for each frequency, the utilization status of the frequency. Details of the white space sensing database 2506 are described later with reference to FIG. 7.

These programs and data, which are stored in the storage 704 in the drawing, are actually loaded onto the memory 702 as the need arises to be executed or used by the CPU 701 as described above. These programs and data may be stored in the memory 702 instead.

FIG. 6 is an explanatory diagram illustrating the configuration of the primary system location/power information database 706 and the primary system antenna pattern information 2505.

The primary system location/power information database 706 includes, for each frequency, information about a business operator of a primary system (a primary system operator), the location of the TV station 201 (a transmitter location) (for example, the latitude and longitude), and the transmission power (Tx power) of the TV station 201. The primary system antenna pattern information 2505 includes, for each frequency, information about the antenna directivity (antenna pattern) of the TV station 201, and the receiving sensitivity of the TV station's broadcasting service (primary system sensitivity), and further includes antenna gain data for each angle of each antenna pattern.

In the U.S., information about the power and the like of signals transmitted from TV stations is disclosed to the public, and the white space database 1103 is therefore provided explicitly within the system in the first embodiment. The white space database 1103 cannot be provided within the system in countries where such information is not disclosed to the public.

FIG. 7 is a diagram illustrating the configuration of the white space sensing database 2506.

The white space sensing database 2506 includes a location (latitude and longitude) where sensing has been executed by the WRAN base station 1101 or others, a protection status, a frequency, received signal power, and an occupation status.

The white space sensing database 2506 holds, for each frequency, the utilization status of the frequency which is obtained through sensing executed by the WRAN base station 1101 or others, and is used to enhance the accuracy of sensing and to allocate a frequency in a white space to a secondary system. The white space sensing database 2506 is updated by the white space sensing database update 2504 by setting up a trigger on the WRAN base station 1101, or by periodically collecting results reported from the WRAN base station 1101.

The white space database 1103 is synchronized with another node by the synchronization tool 2502. This enhances the accuracy of a normalization process through the enhancement of the accuracy of sensing data acquisition time, the interpolation of pieces of sensing data that are measured at different times, and the like.

Described below is an operation that the WRAN customer premise equipment 1102 executes to couple to a network in a case of moved outside a usual service area run by a WRAN base station.

The WRAN customer premise equipment 1102 in this embodiment holds, in advance, for every area in which the WRAN customer premise equipment 1102 may be run, the location of the TV station 201, the Tx power of the TV station 201, the location of the WRAN base station 1101, and the Tx power of the WRAN base station 1101, in a database within the WRAN customer premise equipment 1102. Each piece of location information basically includes latitude-longitude information, but can be any information that can be used to identify a location and to calculate a relative distance. In a case of moved to another location, the WRAN customer premise equipment 1102 having this database first uses GPS or the like to obtain its own location.

In a case where the obtained location (latitude and longitude) of the WRAN customer premise equipment 1102 is given as (cpe_latitutde, cpe_longitude) and the location (latitude and longitude) of the TV station 201 that is obtained from the database within the WRAN customer premise equipment 1102 is given as (tv_latitude, tv_longitude), the distance d2 to the TV station 201 that is closest to the WRAN customer premise equipment 1102 is calculated by Expression 1.

$$d2 = ((cpe\_latitude - tv\_latitude)^2 + (cpe\_longitude - tv\_longitude)^2)^{1/2} \quad \text{Expression 1}$$

Similarly, in a case where the location of the WRAN base station 1101 that is obtained from the database within the WRAN customer premise equipment 1102 is given as (bs_latitude, bs_longitude), the distance ds to the WRAN base station 1101 that is closest to the WRAN customer premise equipment 1102 is calculated by Expression 2.

$$ds = ((cpe\_latitude - bs\_latitude)^2 + (cpe\_longitude - bs\_longitude)^2)^{1/2} \quad \text{Expression 2}$$

In the case where the TV station 201 and/or the WRAN base station 1101 that is closest to the WRAN customer premise equipment 1102 cannot be identified, Expression 1 and Expression 2 are used to calculate relative distances for a plurality of TV stations 201 and/or a plurality of WRAN base stations 1101 that are stored in the database within the WRAN customer premise equipment 1102, and the shortest distance is selected.

The distance d1 between the TV station 201 and the farthest point where TV broadcasting can be received is calculated next as the TV broadcasting service area.

Figure 8:
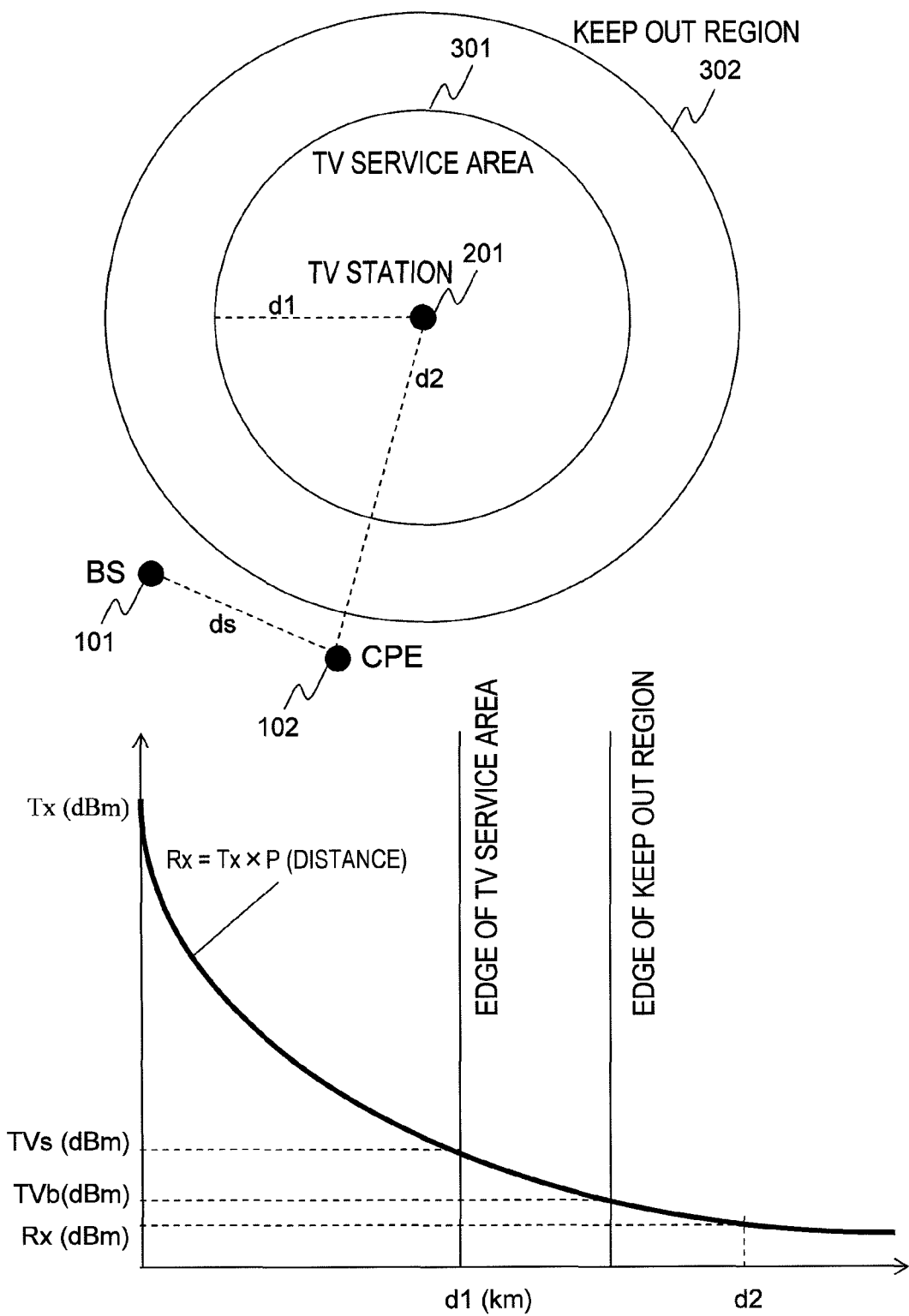
FIG. 8 is an explanatory diagram illustrating a calculation of a distance to a farthest point where TV broadcasting can be received from a TV station of the first embodiment.

As illustrated in FIG. 8, the distance is calculated as follows. In a case where the Tx power of TV broadcasting is given as Tx_tv and propagation properties P of a TV broadcasting frequency are expressed by a function that has distance as a parameter, the receiving sensitivity is expressed by Expression 3 and the distance d1 is calculated by Expression 4. In Expression 4, $P^{-1}(x)$ is an inverse function of $P(x)$.

$$(\text{Receiving sensitivity TVs}) = Tx\_tv \times P(\text{distance}) \quad \text{Expression 3}$$

$$d1 = P^{-1}(TVs/Tx\_tv) \quad \text{Expression 4}$$

The distance d1 can be calculated by using the Tx power Tx_tv of the TV station 201 and the TV receiving sensitivity TVs that are obtained from the database within the WRAN customer premise equipment 1102 in Expression 3 and Expression 4.

The distance calculation method described above is for the case where the location information of each TV station 201 and the location information of each WRAN base station are held within the WRAN customer premise equipment 1102. A distance calculation method that is used in the case where the location information of each TV station 201 and the location information of each WRAN base station are not held within the WRAN customer premise equipment 1102 is described later in a second embodiment.

Figure 9:
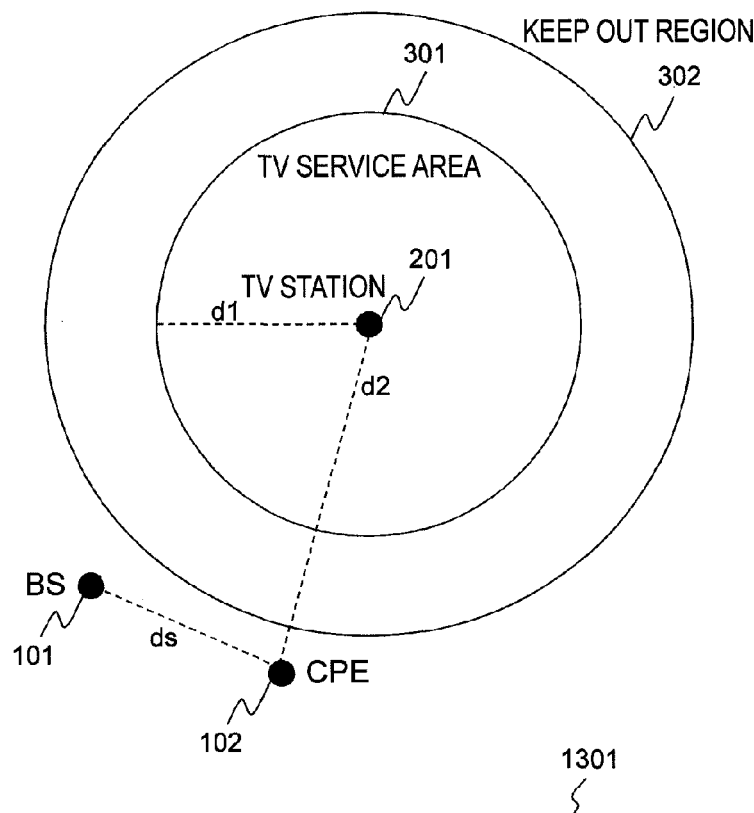
FIG. 9 is an explanatory diagram illustrating a table 1301 of classification situation of the first embodiment.

After the distance ds and a distance (d2−d1) are calculated, the current situation is classified as one of four cases shown in a table 1301 of FIG. 9, based on the magnitude relation between the calculated values and whether or not a broadcast signal from the WRAN base station 1101 can be received.

Case 1 is a case in which the distance ds between the WRAN base station 1101 that is a candidate for coupling and the WRAN customer premise equipment 1102 is shorter than the differential distance (d2−d1) of the distance d1 between the TV station 201 and the farthest point where TV broadcasting can be received from the distance d2 between the TV station 201 and the WRAN customer premise equipment 1102, and a broadcast signal from the coupling candidate WRAN base station 1101 reaches the WRAN customer premise equipment 1102.

Case 2 is a case in which the distance ds between the WRAN base station 1101 that is a candidate for coupling and the WRAN customer premise equipment 1102 is shorter than (d2−d1), and a broadcast signal from the coupling candidate WRAN base station 1101 does not reach the WRAN customer premise equipment 1102.

Case 3 is a case in which the distance ds between the WRAN base station 1101 that is a candidate for coupling and the WRAN customer premise equipment 1102 is (d2−d1) or longer, and a broadcast signal from the coupling candidate WRAN base station 1101 reaches the WRAN customer premise equipment 1102.

Case 4 is a case in which the distance ds between the WRAN base station 1101 that is a candidate for coupling and the WRAN customer premise equipment 1102 is (d2−d1) or longer, and a broadcast signal from the coupling candidate WRAN base station 1101 does not reach the WRAN customer premise equipment 1102.

The method of coupling to a network varies from case to case, and coupling procedures of the respective cases are described below in detail.

Figure 10:
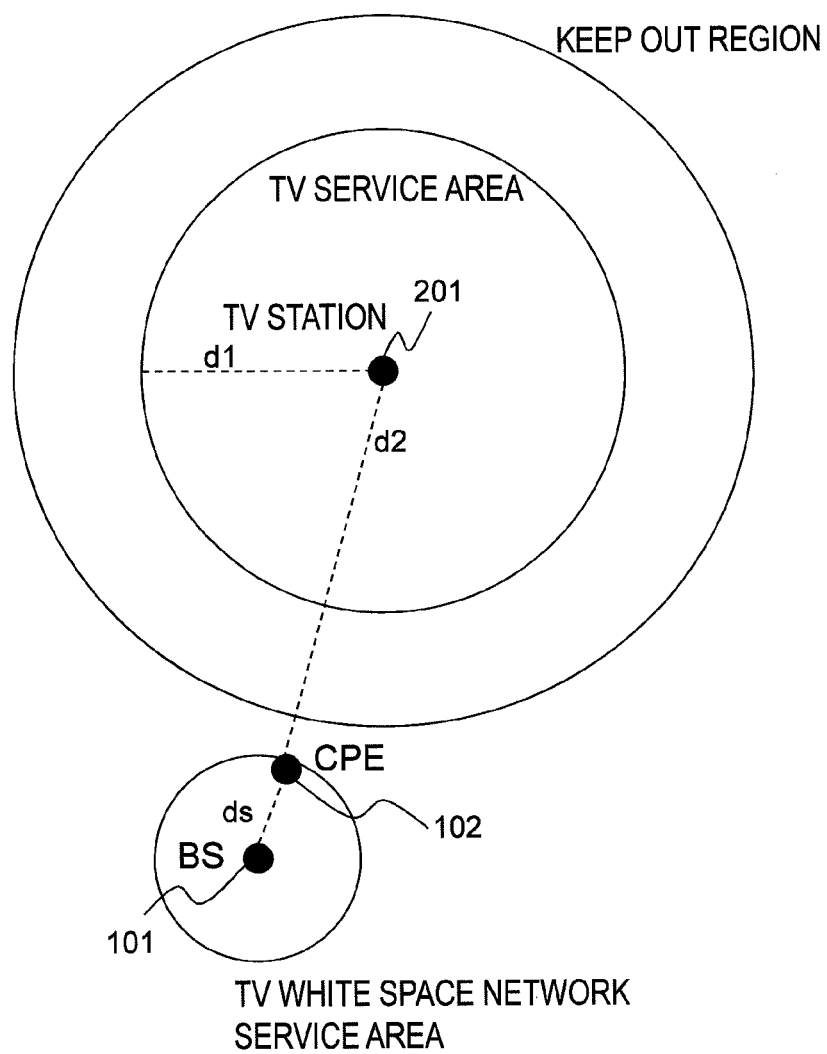
FIG. 10 is an explanatory diagram illustrating a positional relation in Case 1 of the first embodiment.

FIG. 10 illustrates the positional relation of the TV station 201, the WRAN base station 1101, and the WRAN customer premise equipment 1102 in Case 1. In Case 1, as illustrated in FIG. 10, a broadcast signal transmitted from the WRAN base station 1101 reaches the WRAN customer premise equipment 1102, and a transmission signal from the WRAN customer premise equipment 1102 reaches the base station without needing for the WRAN customer premise equipment 1102 to transmit at a power larger than that of a signal from the WRAN base station 1101. In addition, with the distance ds shorter than (d2−d1), it is determined that sending radio waves from the customer premise equipment in this range does not affect TV broadcasting. The WRAN through which the broadcast signal is received is therefore chosen as it is and the following process is executed via a procedure illustrated in FIG. 11.

Figure 11:
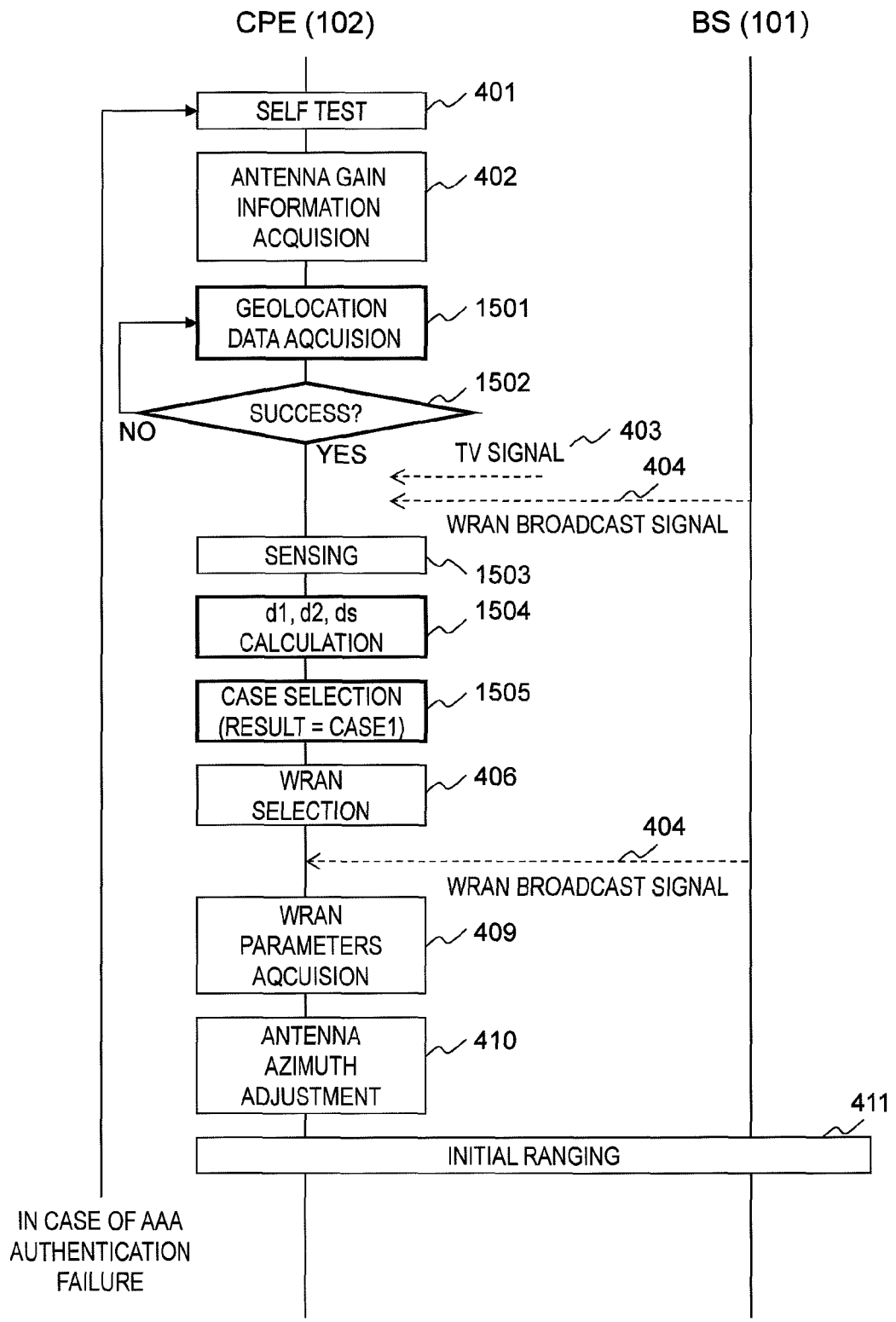
FIG. 11 is a flowchart illustrating a connection sequence in Case 1 of the first embodiment.

In the flowchart of FIG. 11, a geolocation data acquisition process (1501) and a process of confirming the geolocation data acquisition process (1502) precede a sensing process (1503) following a self test (401), because it is necessary to grasp the positional relation of the TV station 201, the WRAN base station 1101, and the WRAN customer premise equipment 1102 first.

In Case 1, the sensing block 508 receives a WRAN broadcast signal in the sensing process (1503). The sensing process (1503) can use various methods for sensing of a signal from the TV station 201 and a WRAN broadcast signal at a frequency in question.

The various methods include, for example, detecting the energy of a received signal. Specifically, the received signal level in a relevant frequency band is measured. In this case, sensing of radio waves in the frequency band is conducted by averaging measurement results that are obtained at a plurality of time points in order to lessen the influence of noise and short-term fluctuations in the propagation path. This method is effective in a case where the signal level is higher than the signal level of noise, and can detect a signal at a frequency in question without depending on the method of modulation and the signal pattern.

Another example of the various methods is detecting a specific pattern. This method utilizes the fact that a synchronization signal for establishing synchronization between the transmission-side node and the receiving-side node is included in, for example, a pilot signal of digital TV broadcasting and a WRAN broadcast signal, and that the synchronization signal is transmitted at given timing. The signal pattern of the synchronization signal can therefore be detected by calculating the time correlation of received signals for a period longer than the transmission cycle of the synchronization signal. Because what is detected is a specific signal pattern, a signal at a frequency in question can be detected even in a case where the signal level is lower than the signal level of noise, and signal detection accuracy is accordingly high. However, utilizing the cyclicity of the synchronization signal, this method takes longer until a determination is made than in the energy detection described above. There is no need to use a specific method for the sensing, and any method that can detect the presence/absence of the TV signal 403 and the WRAN broadcast signal 404 can be employed.

The distance calculation block 2304 next uses Expression 1 to Expression 4 described above to calculate d1, d2, and ds (1504). The case selection block 2309 uses the results of the calculation and the table 1301 for determining conditions which is illustrated in FIG. 9 to select a case (1505). This embodiment is characterized by executing these processes 1501 to 1505.

Figure 24:
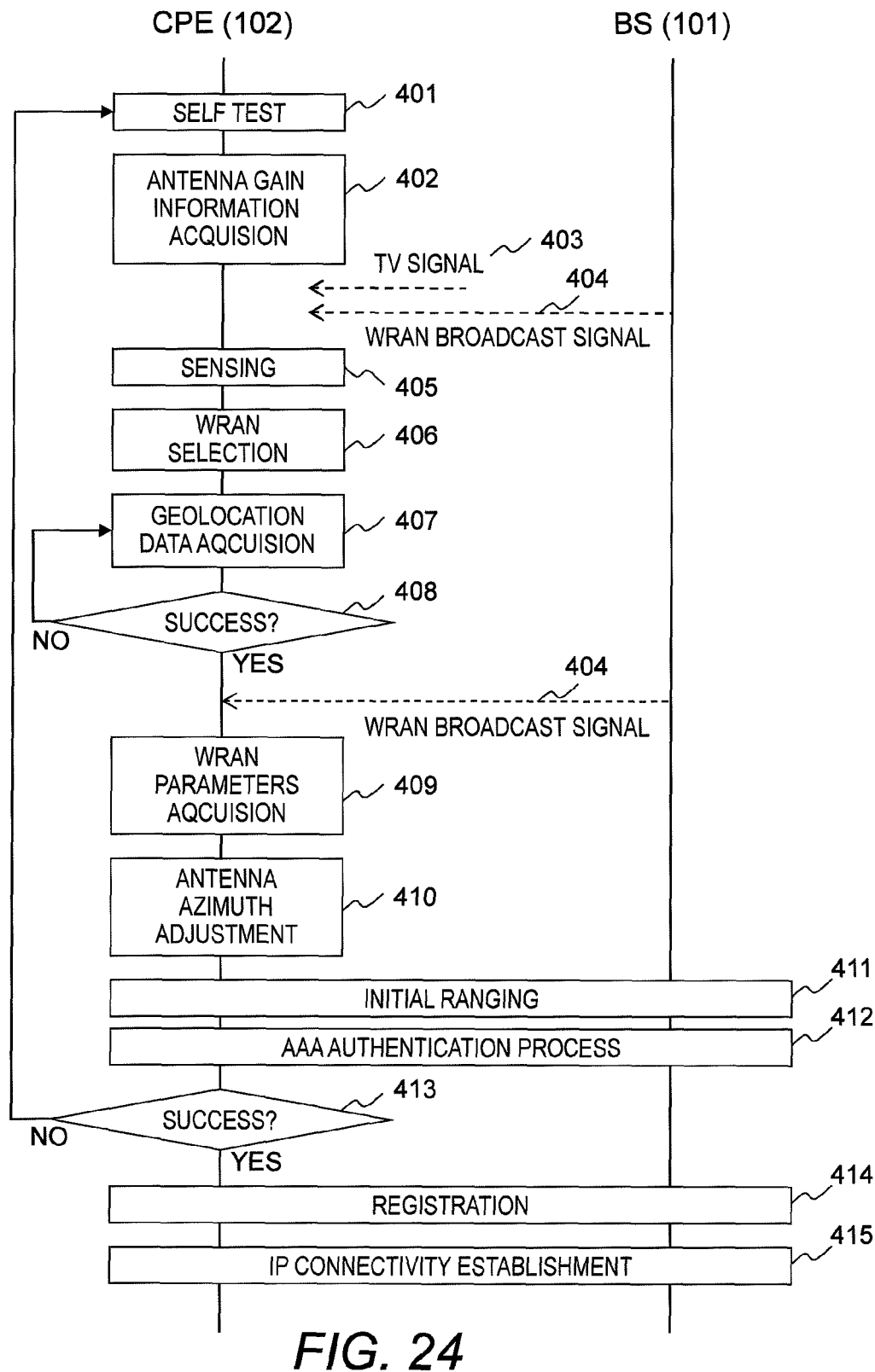
FIG. 24 is a flowchart illustrating a connection sequence in the wireless communication system of prior art.
Figure 25:
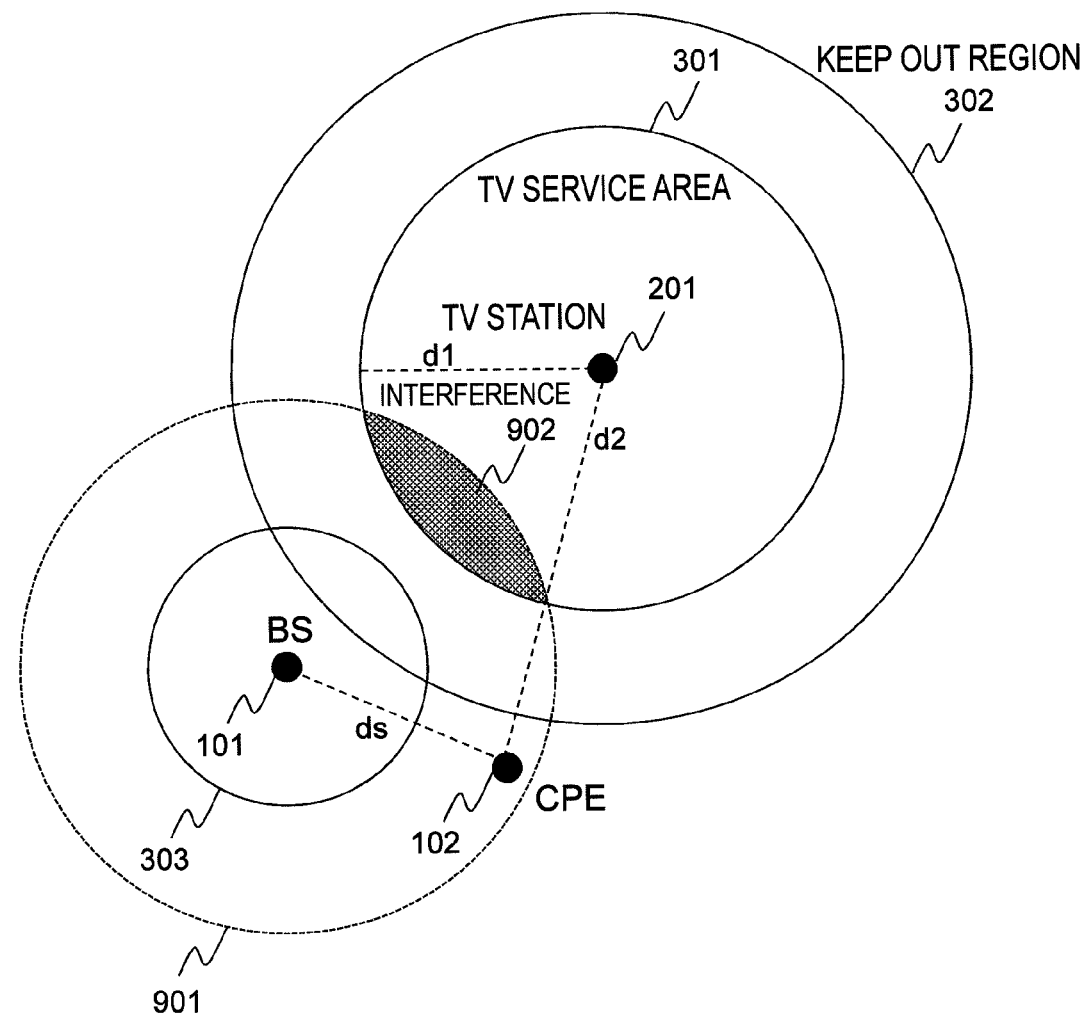
FIGS. 25 and 26 are explanatory diagrams illustrating a state in which a customer premise equipment moves out of a service area in the wireless communication system of prior art.
Figure 26:
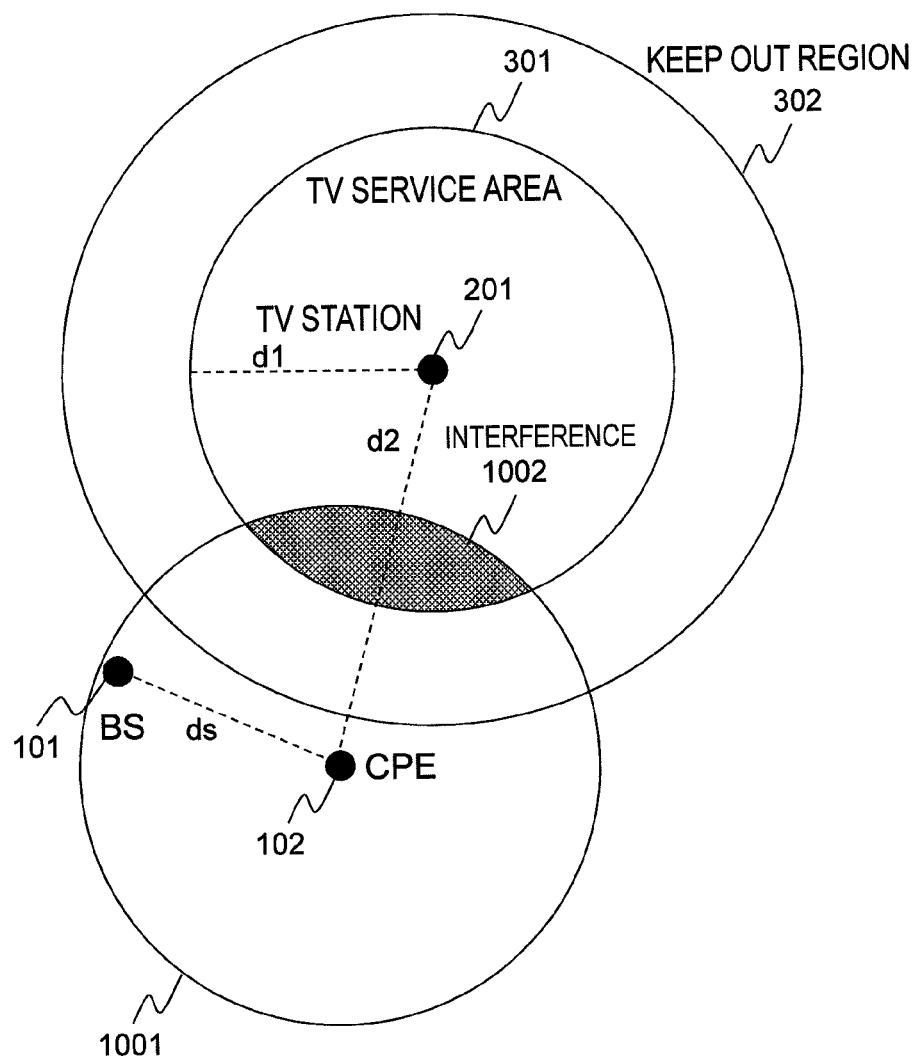

In Case 1, the subsequent processes (from 406 and onward) can be the same as those in the conventional network coupling procedure. Specifically, a WRAN network to which the customer premise equipment 1102 is to be coupled is selected based on the result of the sensing 405 (406) and, after the antenna controller 2308 adjusts the antenna directivity (410), the customer premise equipment 1102 transmits radio waves to the base station 1101 in an attempt to couple (411). Thereafter, the procedure steps 412 to 415 are executed as in the conventional procedure illustrated in FIG. 24.

Case 2 is described next.

Figure 12:
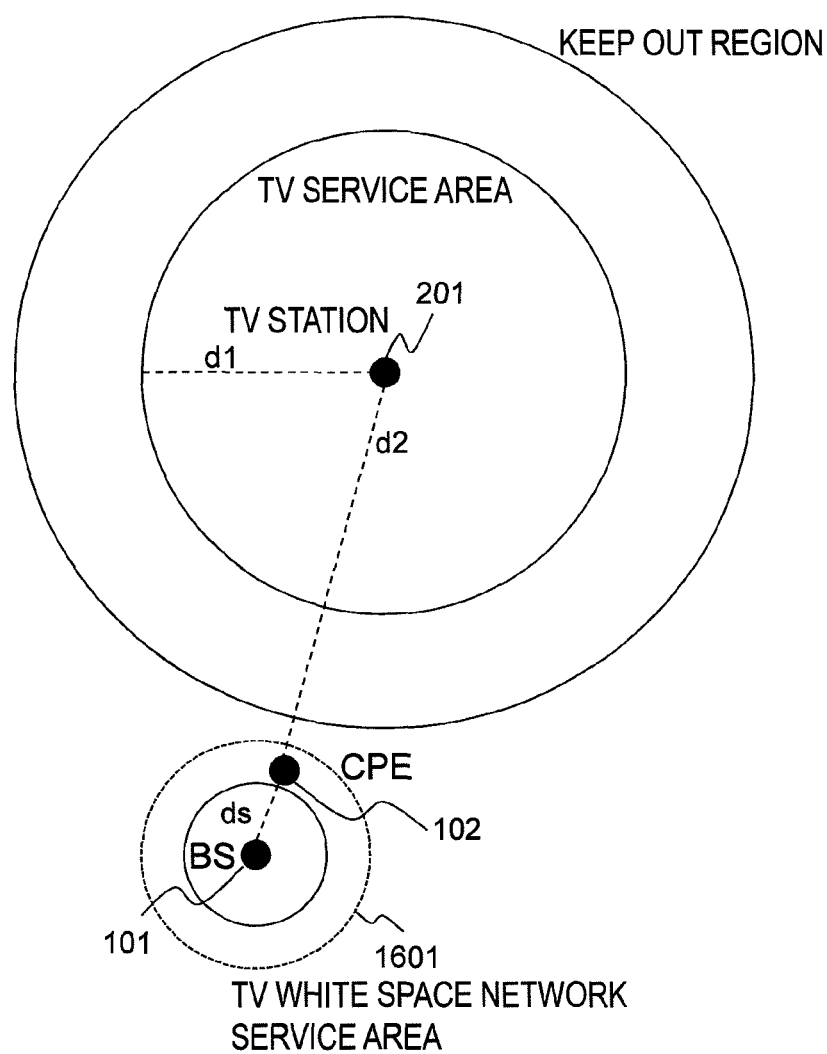
FIG. 12 is an explanatory diagram illustrating a positional relation in Case 2 of the first embodiment.

FIG. 12 illustrates the positional relation of the TV station 201, the WRAN base station 1101, and the WRAN customer premise equipment 1102 in Case 2. In Case 2, as illustrated in FIG. 12, the WRAN customer premise equipment 1102 is far enough from the TV station 201 that sending radio waves at a power that reaches the WRAN base station 1101 does not affect TV broadcasting, but a broadcast signal from the WRAN base station 1101 cannot be received. This case is characterized by exerting control so that the Tx power of the base station is increased until a broadcast signal of the base station spans an expanded service area 1601 and reaches the WRAN customer premise equipment 1102. A concrete flow of the control is illustrated in FIG. 13.

Figure 13:
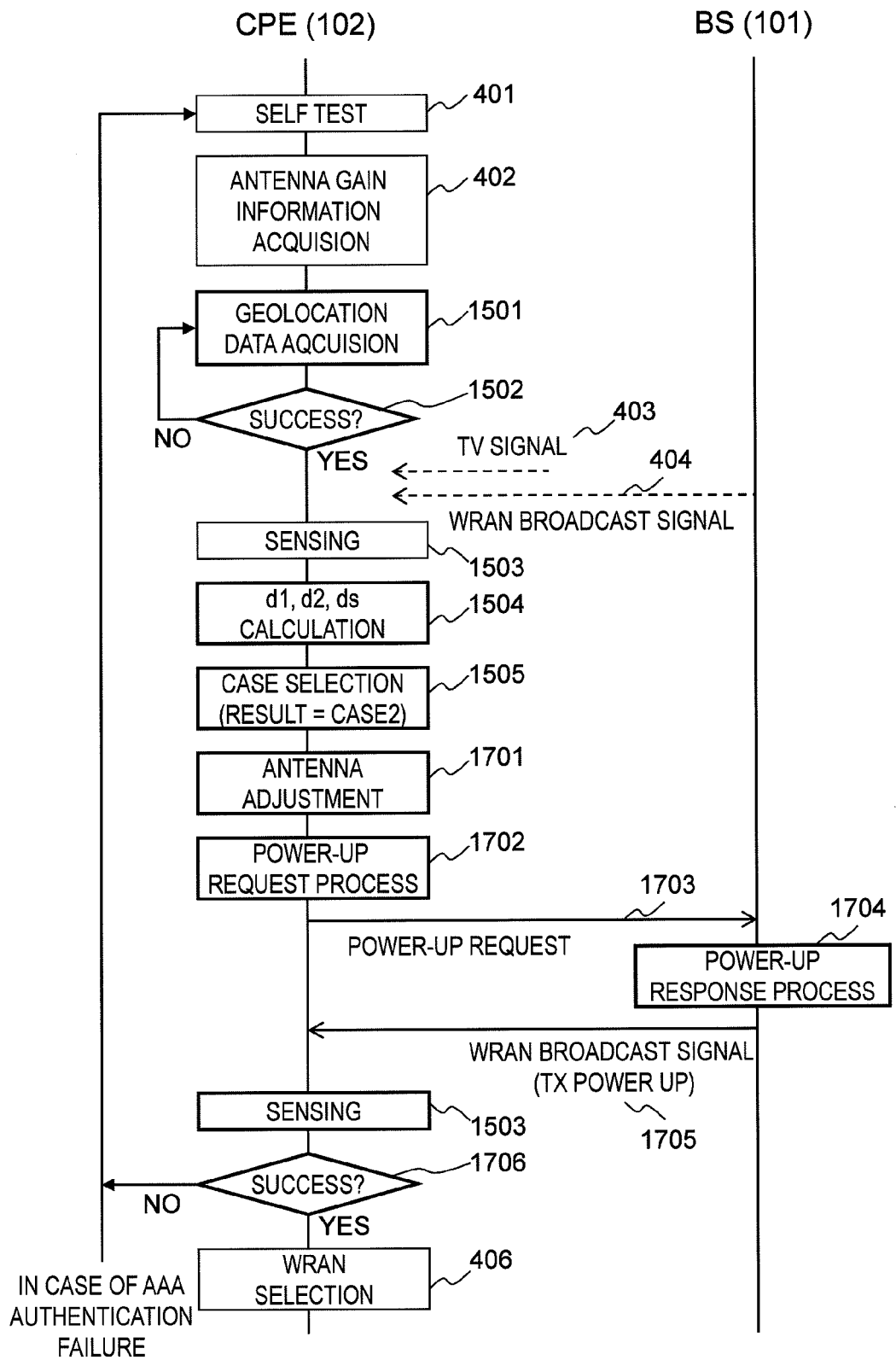
FIG. 13 is a flowchart illustrating a connection sequence in Case 2 of the first embodiment.

The method illustrated in the flowchart of FIG. 13 differs from the conventional method in that the geolocation data acquisition process (1501) and the process of confirming the geolocation data acquisition process (1502) precede the sensing process (1503) following the self test (401), because it is necessary to grasp the positional relation of the TV station 201, the WRAN base station 1101, and the WRAN customer premise equipment 1102 first. These processes are the same as those described in Case 1. The sensing block 508 cannot receive a WRAN broadcast signal in the sensing process (1503) of Case 2.

Next, the distance calculation block 2304 uses Expression 1 to Expression 4 to calculate d1, d2, and ds as in Case 1. The case selection block 2309 then uses the table 1301 for determining conditions which is illustrated in FIG. 9 to select a case based on the results of the calculation (1505). Case 2 is selected as a result.

The antenna controller 2308 next controls the antenna directivity based on the positional relation of the WRAN base station 1101, the WRAN customer premise equipment 1102, and the TV station 201 (antenna adjustment) (1701). In this antenna adjustment, the directivity toward the direction of the WRAN base station 1101 is enhanced along a straight line that connects the WRAN base station 1101 and the WRAN customer premise equipment 1102, and the directivity toward the direction of the TV station 201 is lowered (down to null if possible) along a straight line that connects the TV station 201 and the WRAN customer premise equipment 1102. The antenna directivity can be adjusted by controlling the antenna pattern in the case of an array antenna or by turning in the case of a directional antenna as described above. In the case where the WRAN base station 1101 and the TV station 201 are in the same direction relative to the WRAN customer premise equipment 1102, the antenna is adjusted so that the directivity is enhanced in the direction of the WRAN base station 1101.

Next, the power-up request process block 2305 processes a power-up request from the WRAN customer premise equipment 1102 (a power-up request process) (1702).

The power-up request process block 2305 first determines a power at which the WRAN customer premise equipment 1102 transmits from information about antenna gain of the WRAN customer premise equipment 1102 in the direction of the WRAN base station 1101 which is based on the adjustment result of the antenna adjustment (1701), the distance between the WRAN base station 1101 and the WRAN customer premise equipment 1102 (ds), and the receiving sensitivity at the WRAN base station 1101 (BS_sensitivity).

Specifically, when the gain of the antenna of the WRAN customer premise equipment 1102 in the direction of the WRAN base station 1101 is given as Gain_cpe, and a customer premise equipment Tx power to be calculated is given as Tx_cpe, the receiving sensitivity is calculated by Expression 3' and the Tx power is calculated by Expression 5.

$$(\text{Receiving sensitivity}(BS\_sensitivity)) = Tx\_cpe \times P(ds) \times Gain\_cpe \quad \text{Expression 3'}$$

$$Tx\_cpe = BS\_sensitivity / (P(ds) \times Gain) \quad \text{Expression 5}$$

Interference in other directions needs to be taken into account and the WRAN customer premise equipment 1102 cannot transmit at a power that exceeds its limit Tx power. The Tx power is set under these constraints.

Figure 19:
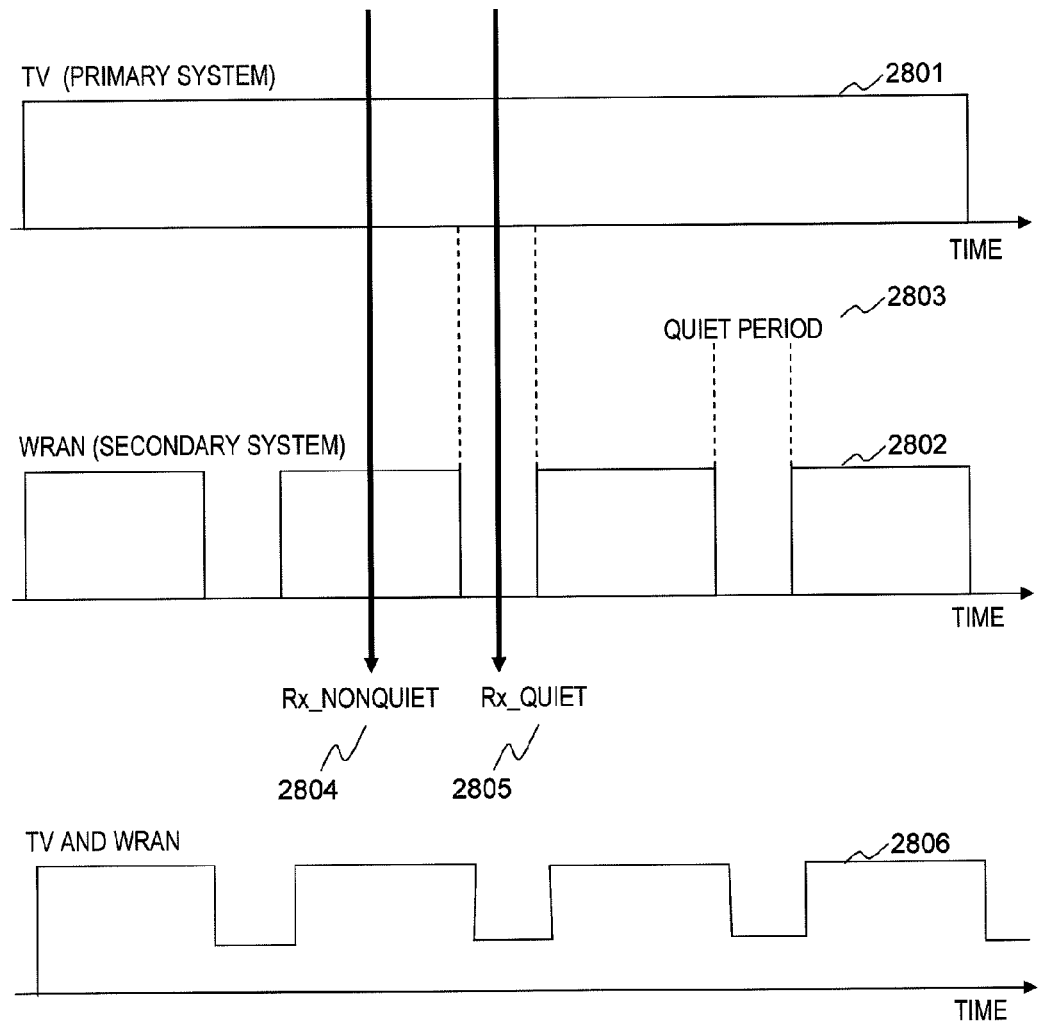
FIG. 19 is an explanatory diagram illustrating sensing timing of a second embodiment.

Next, a quiet period for detecting other systems than the primary system and WRANs at the calculated Tx power is provided in the power-up request process (1702) in order to inform the WRAN base station 1101 of the presence of the WRAN customer premise equipment 1102. In the quiet period, a power-up request 1703 is transmitted to the WRAN base station 1101. As illustrated in FIG. 19, a quiet period 2803 is set cyclically along the time axis.

The power-up request 1703 contains a signal having a specific pattern, which can be any pattern as long as the WRAN system can uniquely identify the signal as a power-up request. A desired pattern is a cyclic pattern so that the signal is identified as a request from the WRAN customer premise equipment 1102 to raise detection accuracy in the sensing process at the WRAN base station 1101.

The WRAN base station 1101 conducts sensing to sense the presence/absence of a primary system in the quiet period which is set cyclically in the WRAN system. In a case where receiving a power-up request, the WRAN base station 1101 executes a power-up response process (1704) in the quiet period. In the power-up response process (1704), a WRAN signal is received as in the sensing process (1503). The sensing that is executed by the WRAN base station 1101 in the power-up response process (1704) is usually the detection of the energy of received signals. However, the sensing particularly involves detecting the pattern (feature amount) of a power-up request signal in order to discriminate the power-up request (1703) from signals sent by the primary system and other secondary systems.

In a case where a power-up request is received, the power-up response process block 2404 determines that there is a customer premise equipment at a distance where the CPE does not affect TV broadcasting in the power-up response process (1704), and first reduces interference and adjusts the antenna so that the TV broadcasting service area is not affected. This antenna adjustment is the same as the one in the WRAN customer premise equipment 1102. Specifically, the directivity toward the direction of the WRAN customer premise equipment 1102 is enhanced along a straight line that connects the WRAN base station 1101 and the WRAN customer premise equipment 1102, and the directivity toward the direction of the TV station 201 is lowered (down to null if possible) along a straight line that connects the TV station 201 and the WRAN base station 1101. The antenna directivity can be controlled by building the antenna pattern from an array antenna or by turning an installation position of an antenna as described above. In the case where the WRAN customer premise equipment 1102 and the TV station 201 are in the same direction relative to the WRAN customer premise equipment 1102, the antenna is adjusted so that the directivity is enhanced in the direction of the WRAN customer premise equipment 1102.

The power-up response process block 2404 determines a power at which the WRAN base station 1101 transmits from information about antenna gain of the WRAN base station 1101 in the direction of the WRAN customer premise equipment 1102 which is based on the adjustment result of this antenna adjustment, the distance ds between the WRAN base station 1101 and the WRAN customer premise equipment 1102, and the receiving sensitivity CPE_sensitivity at the WRAN customer premise equipment 1102.

Specifically, when the gain of the antenna of the WRAN base station 1101 in the direction of the WRAN customer premise equipment 1102 is given as Gain_bs, and a WRAN base station 1101 Tx power to be calculated is given as Tx_bs, the receiving sensitivity is calculated by Expression 3" and the Tx power is calculated by Expression 6.

$$\text{Receiving sensitivity}(CPE\_sensitivity) = Tx\_bs \times P(ds) \times Gain \quad \text{Expression 3''}$$

$$Tx\_bs = CPE\_sensitivity / (P(ds) \times Gain) \quad \text{Expression 6}$$

The WRAN base station 1101 transmits a broadcast signal at the calculated Tx power. Interference in other directions needs to be taken into account and the WRAN base station 1101 cannot transmit at a power that exceeds its limit Tx power. The Tx power is set under these constraints.

The chance of the WRAN customer premise equipment 1102 receiving a WRAN broadcast signal is increased in this manner. The WRAN customer premise equipment 1102 executes the sensing process (1503) again, and checks whether a WRAN broadcast signal has successfully been detected (1706). In the case where a wanted WRAN system signal has been detected successfully, the WRAN customer premise equipment 1102 moves on to the subsequent processes for coupling to a network (from 406 and onward). Specifically, after the process 406, the processes 410 to 415 are executed, though omitted from FIG. 13. In the case where a wanted WRAN system signal has not been detected successfully ("No" in 1706), on the other hand, it is determined that a request from the WRAN customer premise equipment 1102 has not reached the WRAN base station 1101, or a high enough Tx power cannot be set for transmission from the WRAN base station 1101 due to constraints of the surrounding situation or the like, and the WRAN customer premise equipment 1102 gives up coupling to a WRAN system in that area.

In the example FIG. 13, the WRAN customer premise equipment 1102 transmits the power-up request (1703) at a power calculated so that the signal reaches the WRAN base station 1101. Desirably, the power of radio waves sent to the WRAN base station 1101 is increased gradually by taking into consideration other systems that share the same frequency secondarily (in other words, so as to minimize the effect to other secondary systems). A flowchart of this control is illustrated in FIG. 14.

Figure 14:
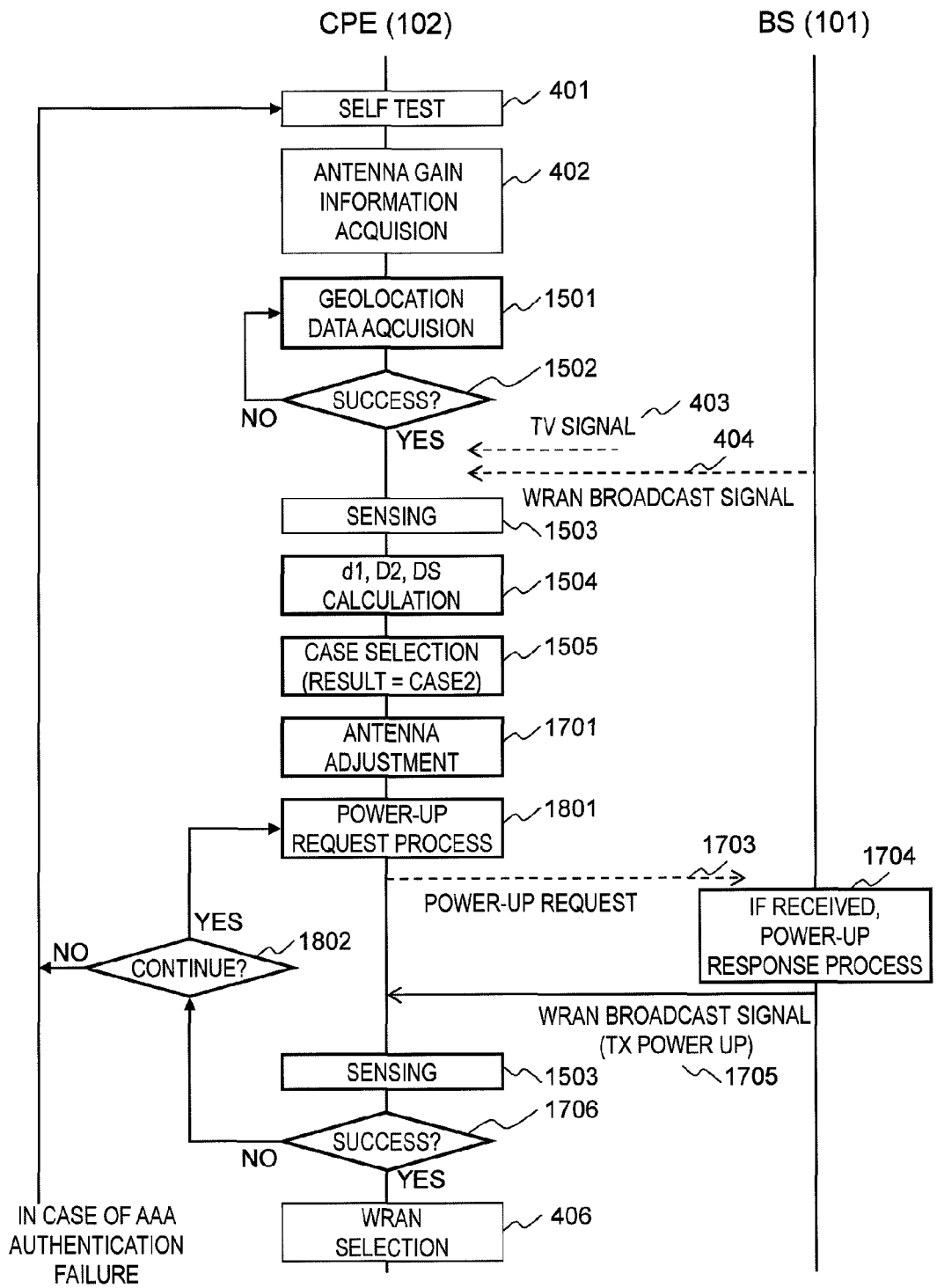
FIG. 14 is a flowchart illustrating a connection another example of a sequence in Case 2 of the first embodiment.

While the power-up request process (1702) is complete by executing the process once in FIG. 13, the power-up request (1703) is transmitted by increasing the Tx power gradually (1801) in FIG. 14. The Tx power is gradually increased by repeating a Tx power increase feasibility determining process (1802) until the power-up request (1703) is detected in the power-up response process (1704) at the WRAN base station 1101 and a WRAN broadcast signal is transmitted at an increased Tx power, or until the WRAN customer premise equipment 1102 can successfully detect a WRAN broadcast signal. The WRAN customer premise equipment 1102 in this case adjusts the Tx power only to the range that the TV broadcasting service area is not affected because it is imperative not to affect TV broadcasting which is the primary system.

Case 3 is described next.

Figure 15:
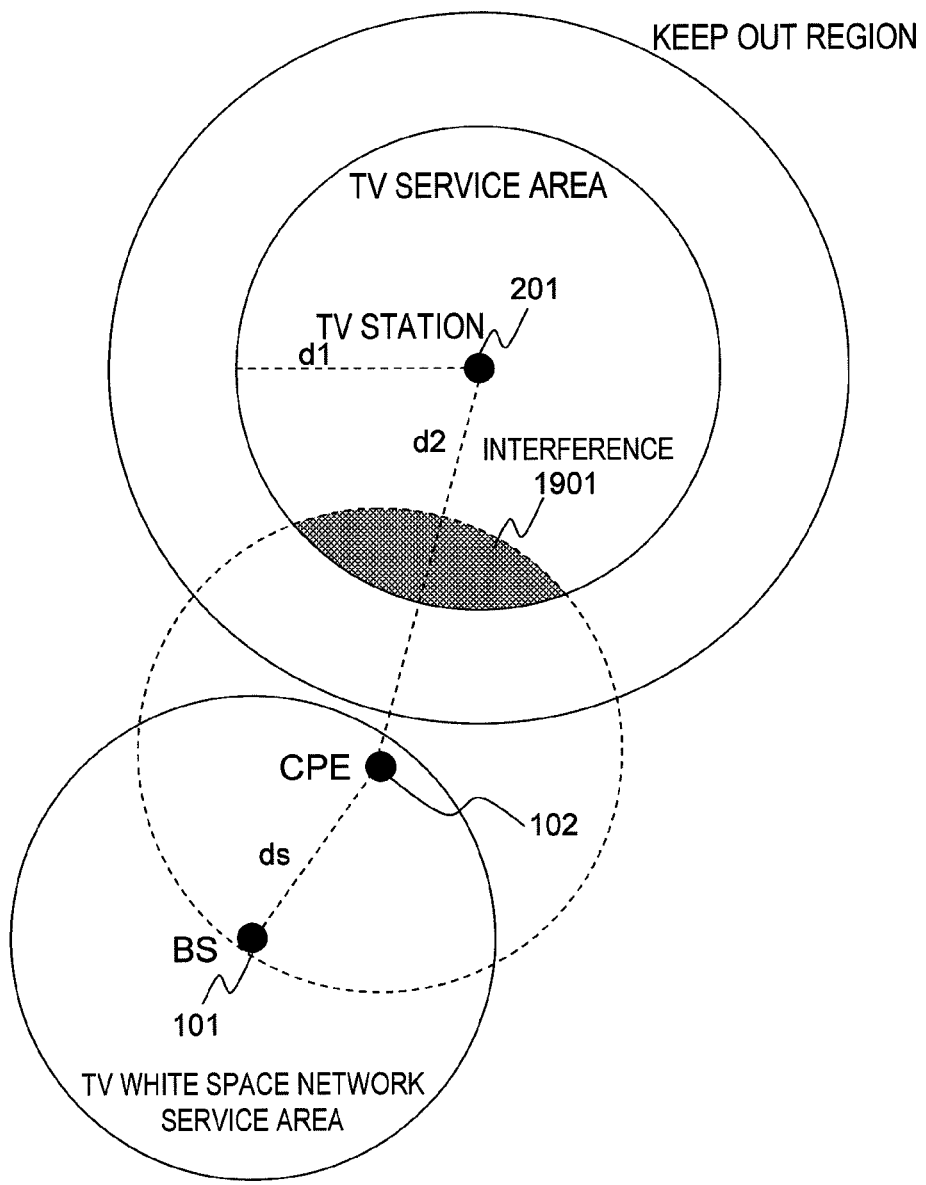
FIG. 15 is an explanatory diagram illustrating a positional relation in Case 3 of the first embodiment.

FIG. 15 illustrates the positional relation of the TV station 201, the WRAN base station 1101, and the WRAN customer premise equipment 1102 in Case 3. In Case 3, a broadcast signal from the WRAN base station 1101 reaches the WRAN customer premise equipment 1102 as illustrated in FIG. 15. However, transmitting radio waves from the WRAN customer premise equipment 1102 in a manner that makes sure that the radio waves reach the WRAN base station 1101 creates an area 1901, where the TV broadcasting service area of the TV station which is the primary system could be affected. In this case, the interference calculation block 2303 of the WRAN customer premise equipment 1102 calculates interference of the surroundings, calculates antenna directivity that does not affect the TV broadcasting service area, and controls the directivity in transmission from the WRAN customer premise equipment 1102. In the case where it is determined as a result that the WRAN customer premise equipment 1102 can hold communication to/from the WRAN base station 1101 without affecting TV broadcasting, the WRAN customer premise equipment 1102 moves on to the subsequent processes for coupling to a network. In the case where it is determined that a signal transmitted from the WRAN customer premise equipment 1102 affects the TV broadcasting service area, the WRAN customer premise equipment 1102 is controlled so as to give up coupling.

Figure 16:
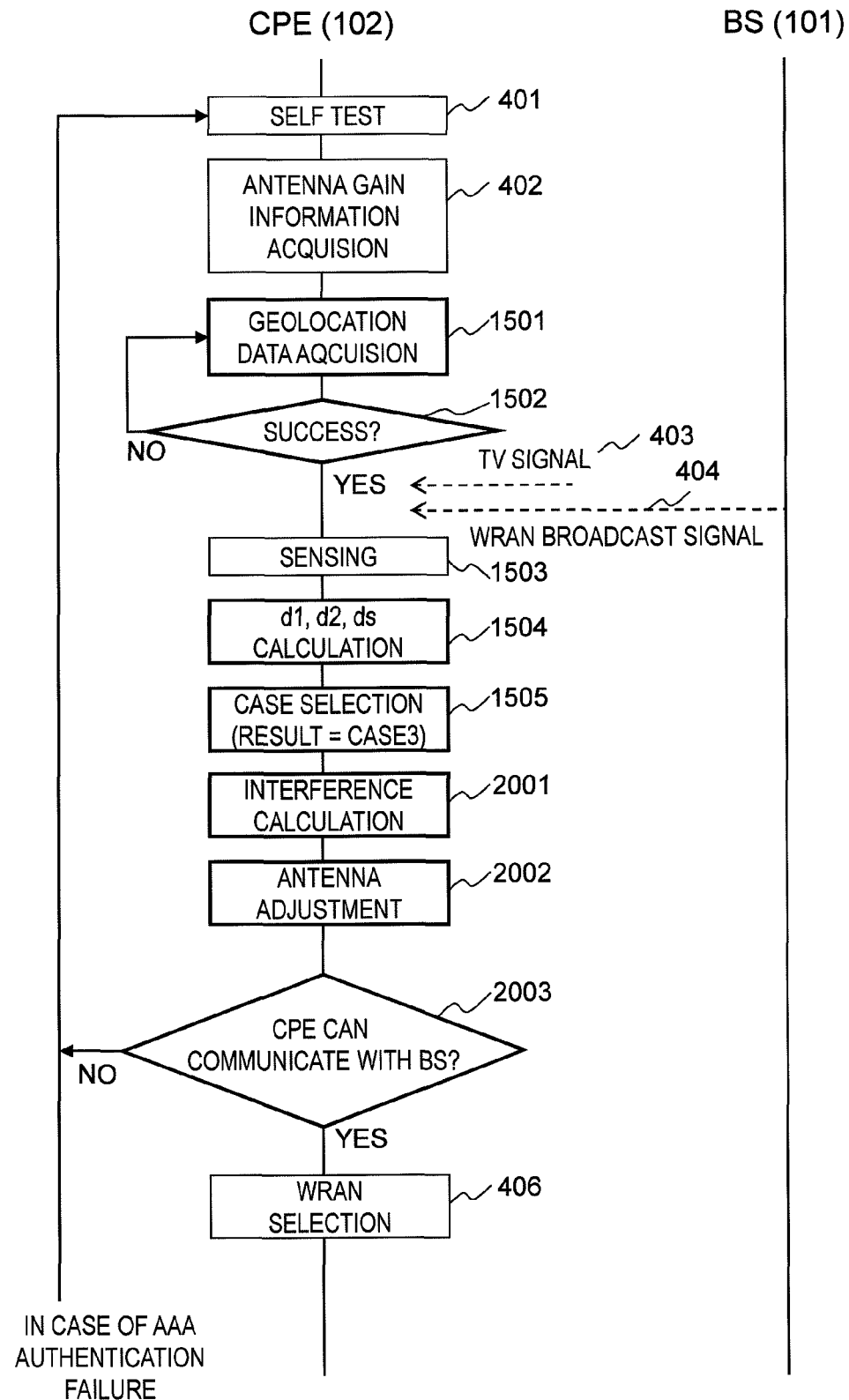
FIG. 16 is a flowchart illustrating a connection sequence in Case 3 of the first embodiment.

FIG. 16 illustrates a concrete control flow in Case 3.

The geolocation data acquisition process (1501) and the process of confirming the geolocation data acquisition process (1502) precede the sensing process (1503) following the self test (401), because it is necessary to grasp the positional relation of the TV station 201, the WRAN base station 1101, and the WRAN customer premise equipment 1102 first. These processes are the same as those described in Case 1. The sensing block 508 receives a WRAN broadcast signal in the sensing process (1503) of Case 3.

Next, the distance calculation block 2304 calculates d1, d2, and ds (1504). The distances d1, d2, and ds are calculated with the use of Expression 1 to Expression 4 described above as in Case 1. The case selection block 2309 then selects a case by taking the results of the calculation into account and using the table 1301 of FIG. 9 for determining conditions. Case 3 is selected as a result.

Next, the interference calculation block 2303 executes a process of calculating interference of the WRAN customer premise equipment 1102 based on the positional relation of the WRAN base station 1101, the WRAN customer premise equipment 1102, and the TV station 201 (interference calculation) (2001). In this interference calculation process, an antenna pattern that enhances the directivity toward the direction of the WRAN base station 1101 along a straight line connecting the WRAN base station 1101 and the WRAN customer premise equipment 1102, and that lowers (down to null if possible) the directivity toward direction of the TV station 201 along a straight line connecting the TV station 201 and the WRAN customer premise equipment 1102 is calculated based on the antenna pattern at the TV station 201.

In the next process which is antenna adjustment (2002), the antenna controller 2308 adjusts the array antenna, or turns the directional-antenna, based on the result of the calculation. In the case where the WRAN base station 1101 and the TV station 201 are in the same direction relative to the WRAN customer premise equipment 1102, the antenna is adjusted so that the directivity is enhanced in the direction of the WRAN base station 1101.

Next, the power-up request process block 2305 calculates the Tx power for transmission from the WRAN customer premise equipment 1102. The power-up request process block 2305 first determines a power at which the WRAN customer premise equipment 1102 transmits from information about antenna gain Gain_cpe of the WRAN customer premise equipment 1102 in the direction of the WRAN base station 1101 which is based on the adjustment result of the antenna adjustment (2202), antenna gain information Gain_tv of the TV station 201 in the direction of the CPE along a straight line connecting the TV station 201 and the WRAN customer premise equipment 1102, the distance ds between the WRAN base station 1101 and the WRAN customer premise equipment 1102, and the receiving sensitivity BS_sensitivity at the WRAN base station 1101.

Specifically, when a customer premise equipment Tx power to be calculated is given as Tx_cpe, the receiving sensitivity is calculated by Expression 3''' and the Tx power is calculated by Expression 5.

(Receiving sensitivity(BS_sensitivity))=Tx_cpe×$P(ds)$×Gain_cpe     Expression 3'''

Tx_cpe=BS_sensitivity/($P(ds)$×Gain_cpe)     Expression 5

The power-up request process block 2305 determines at this point whether the WRAN customer premise equipment 1102 can hold communication to/from the WRAN base station 1101 without interfering with the TV broadcasting service area (2003). Specifically, the directivity of the TV station 201 toward the direction of the WRAN customer premise equipment 1102 along a straight line connecting the TV station 201 and the WRAN customer premise equipment 1102 is given as Gain_tv, the directivity of the WRAN customer premise equipment 1102 toward the direction of the TV station 201 along the straight line connecting the TV station 201 and the WRAN customer premise equipment 1102 is given as Gain_cpe_tv, and an estimated power Rx_est that radio waves transmitted from the WRAN customer premise equipment 1102 are estimated to have at the boundary of the TV broadcasting service area is calculated from these pieces of information with the use of Expression 7.

$$Rx\_est = Tx\_cpe \times Gain\_cpe\_tv \times P(d2-d1) \times Gain\_tv \quad \text{Expression 7}$$

The calculated power Rx_est is compared against TV receiving sensitivity Sensitivity_tv in the TV broadcasting service area and, in a case where the estimation is lower than the TV receiving sensitivity, it is determined that the WRAN customer premise equipment 1102 can hold communication to/from the WRAN base station 1101 (Expression 8).

If (Rx_est<Sensitivity_tv) [radio wave transmission from the WRAN customer premise equipment 1102 is feasible]

else [radio wave transmission from the WRAN customer premise equipment 1102 is not feasible]   Expression 8

The subsequent processes (from 406 and onward) are the same as in the conventional network coupling flow. Specifically, after the process 406, the processes 410 to 415 are executed, though omitted from FIG. 16.

Case 4 is described next.

Figure 17:
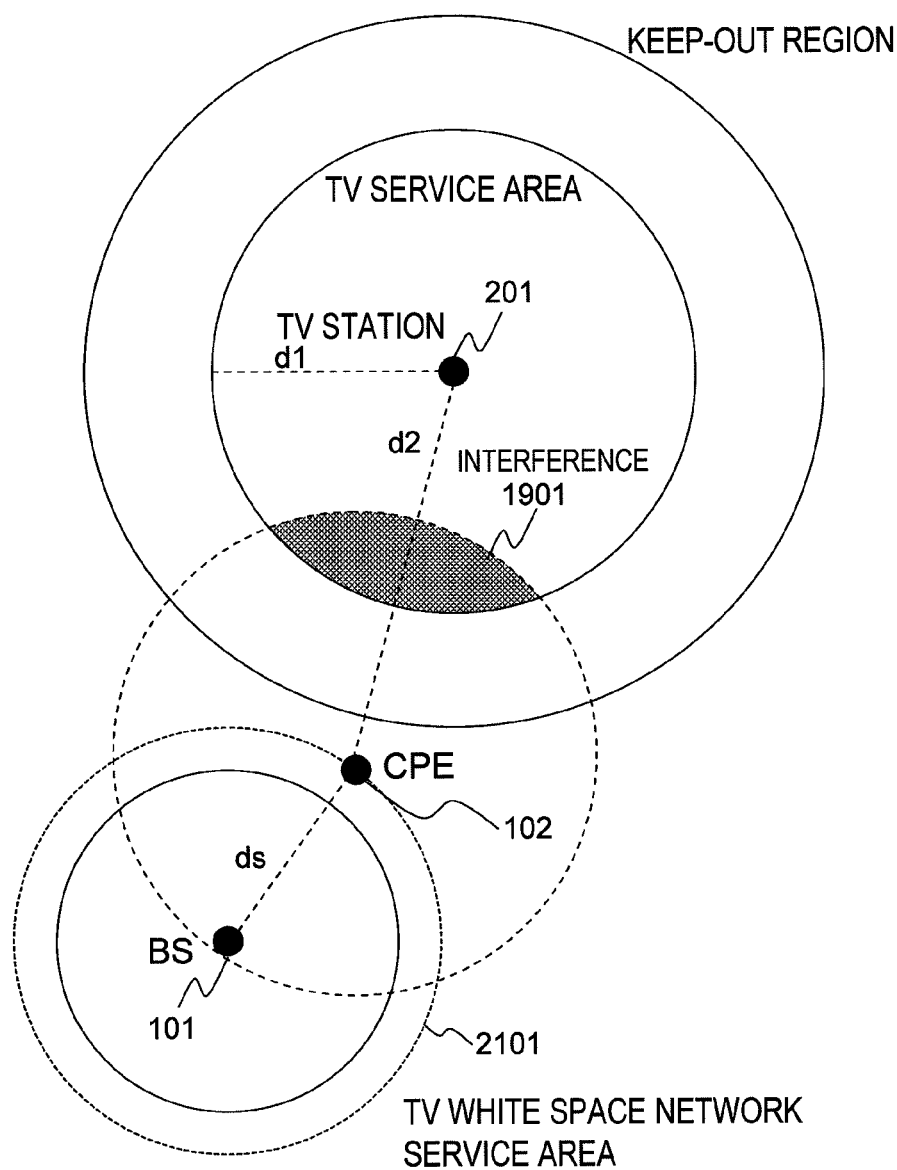
FIG. 17 is an explanatory diagram illustrating a positional relation in Case 4 of the first embodiment.

FIG. 17 illustrates the positional relation of the TV station 201, the WRAN base station 1101, and the WRAN customer premise equipment 1102 in Case 4. In Case 4, a broadcast signal transmitted from the WRAN base station 1101 does not reach the WRAN customer premise equipment 1102 as illustrated in FIG. 17. In addition, transmitting radio waves from the WRAN customer premise equipment 1102 in a manner that makes sure that the radio waves reach the WRAN base station 1101 creates the area 1901, where the TV broadcasting service area of the TV station which is the primary system could be affected. In this case, the interference calculation block 2303 of the WRAN customer premise equipment 1102 calculates interference of the surroundings, and determines whether a signal transmitted from the customer premise equipment affects the TV broadcasting service area. The power-up request process block 2305 executes a power-up request process for the WRAN base station 1101 in which a specific pattern is sent to the WRAN base station 1101 in a quiet period to the range that the TV broadcasting service area is not affected.

Figure 18:
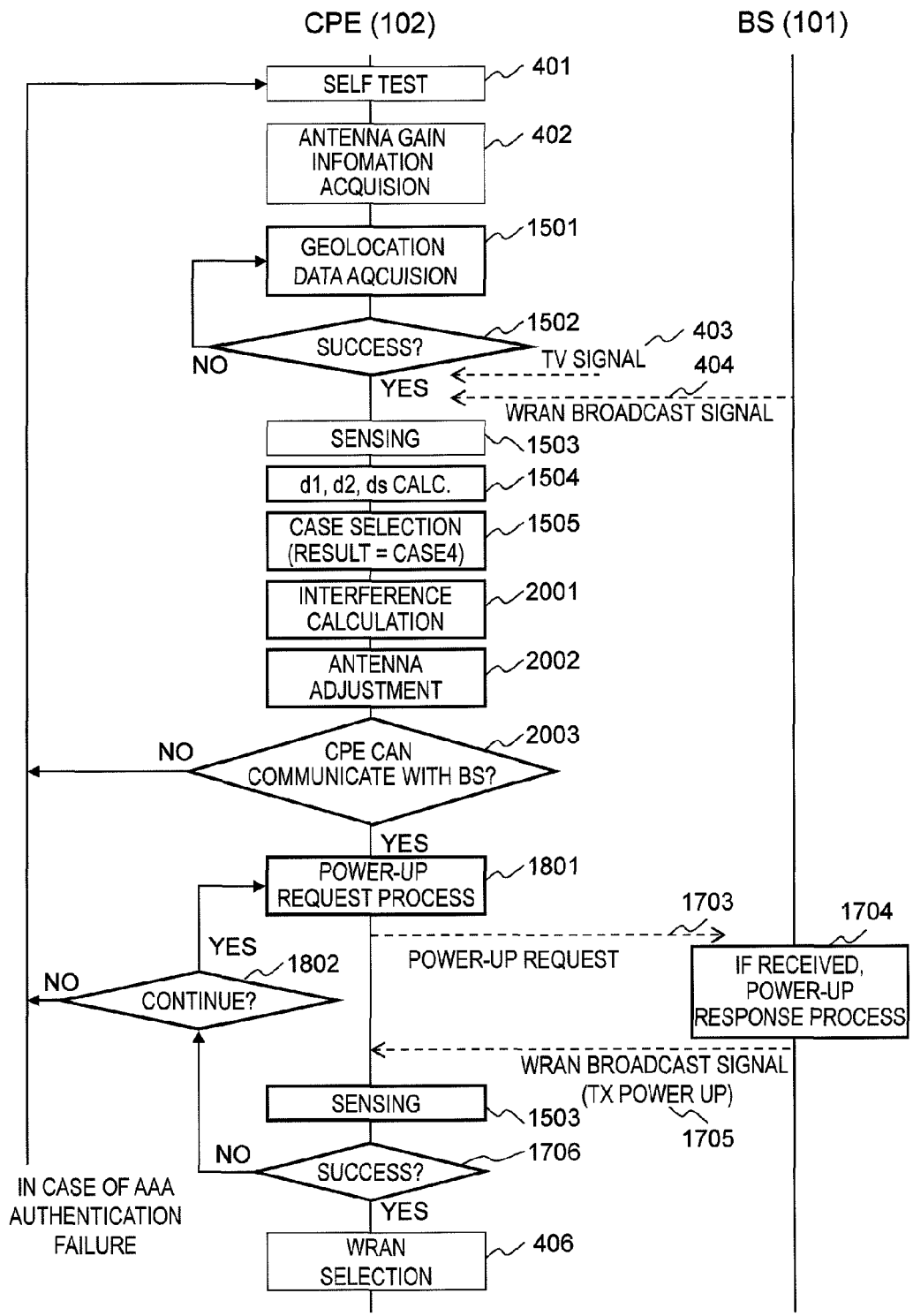
FIG. 18 is a flowchart illustrating a connection sequence in Case 4 of the first embodiment.

FIG. 18 illustrates a concrete control flow in Case 4.

The geolocation data acquisition process (1501) and the process of confirming the geolocation data acquisition process (1502) precede the sensing process (1503) following the self test (401), because it is necessary to grasp the positional relation of the TV station 201, the WRAN base station 1101, and the WRAN customer premise equipment 1102 first. These processes are the same as those described in Case 1. The sensing block 508 receives a WRAN broadcast signal in the sensing process (1503) of Case 4.

Next, the distance calculation block 2304 calculates d1, d2, and ds (1504). The distances d1, d2, and ds are calculated with the use of Expression 1 to Expression 4 described above as in Case 1. The case selection block 2309 then selects a case by taking the results of the calculation into account and using the table 1301 of FIG. 9 for determining conditions. Case 4 is selected as a result.

Next, the interference calculation block 2303 executes a process of calculating interference of the WRAN customer premise equipment 1102 based on the positional relation of the WRAN base station 1101, the WRAN customer premise equipment 1102, and the TV station 201 (interference calculation) (2001). In this interference calculation process, an antenna pattern that enhances the directivity toward the direction of the WRAN base station 1101 along a straight line connecting the WRAN base station 1101 and the WRAN customer premise equipment 1102, and that lowers (down to null if possible) the directivity toward the TV station 201 along a straight line connecting the TV station 201 and the WRAN customer premise equipment 1102 is calculated based on the antenna pattern at the TV station 201.

In the next process which is antenna adjustment (2202), the antenna controller 2308 adjusts the array antenna, or turns the directional antenna, based on the result of the calculation. In the case where the WRAN base station 1101 and the TV station 201 are in the same direction relative to the WRAN customer premise equipment 1102, the antenna is adjusted so that the directivity is enhanced in the direction of the WRAN base station 1101.

Next, the power-up request process block 2305 calculates the Tx power for transmission from the WRAN customer premise equipment 1102. The power-up request process block 2305 first determines a power at which the WRAN customer premise equipment 1102 transmits from information about antenna gain Gain_cpe of the WRAN customer premise equipment 1102 in the direction of the WRAN base station 1101 which is based on the adjustment result of the antenna adjustment (2202), antenna gain information Gain_tv of the TV station 201 in the direction of the CPE along a straight line connecting the TV station 201 and the WRAN customer premise equipment 1102, the distance ds between the WRAN base station 1101 and the WRAN customer premise equipment 1102, and the receiving sensitivity BS_sensitivity at the WRAN base station 1101.

Specifically, when a customer premise equipment Tx power to be calculated is given as Tx_cpe, the receiving sensitivity is calculated by Expression 3' and the Tx power is calculated by Expression 5 as in the foregoing.

$$(\text{Receiving sensitivity}(BS\_sensitivity)) = Tx\_cpe \times P(ds) \times Gain\_cpe \quad \text{Expression 3'}$$

$$Tx\_cpe = BS\_sensitivity / (P(ds) \times Gain\_cpe) \quad \text{Expression 5}$$

The power-up request process block 2305 determines at this point whether the WRAN customer premise equipment 1102 can hold communication to/from the WRAN base station 1101 without interfering with the TV broadcasting service area (2003). Specifically, the directivity of the TV station 201 toward the direction of the CPE along a straight line connecting the TV station 201 and the WRAN customer premise equipment 1102 is given as Gain_tv, the directivity of the WRAN customer premise equipment 1102 toward the direction of the TV station 201 along the straight line connecting the TV station 201 and the WRAN customer premise equipment 1102 is given as Gain_cpe_tv, and an estimated power Rx_est that radio waves transmitted from the WRAN customer premise equipment 1102 are estimated to have at the boundary of the TV broadcasting service area is calculated from these pieces of information with the use of Expression 7.

$$Rx\_est = Tx\_cpe \times Gain\_cpe\_tv \times P(d2-d1) \times Gain\_tv \quad \text{Expression 7}$$

The calculated power Rx_est is compared against TV receiving sensitivity Sensitivity_tv in the TV broadcasting service area and, in a case where the estimation is lower than the TV receiving sensitivity, it is determined that the WRAN customer premise equipment 1102 can hold communication to/from the WRAN base station 1101 (Expression 8).

If (Rx_est<Sensitivity_tv) [radio wave transmission from the WRAN customer premise equipment 1102 is feasible]

else [radio wave transmission from the WRAN customer premise equipment 1102 is not feasible]   Expression 8

In Case 4, the processing up to 2003 are the same as in Case 3. Further, the processes from 1801 and onward are the same as the power-up request process in Case 2. Thus, specific description of the processes from 1801 and onward are omitted. Specifically, a specific pattern is sent from the WRAN customer premise equipment 1102 to the WRAN base station 1101 as the power-up request signal (1801). Then, in the case where the WRAN base station 1101 detects the specific pattern, the WRAN base station 1101 increases the transmission power of the WRAN broadcast signal 1705 and sends the WRAN broadcast signal 1705 (1704). Thus, the chances of detecting the WRAN broadband signal by the WRAN customer premise equipment 1102 are increased (1503).

The subsequent processes (from 406 and onward) are the same as in the conventional network coupling flow. Specifically, after the process 406, the processes 410 to 415 are executed, though omitted from FIG. 18.

As has been described, according to the first embodiment of this invention, a WRAN service area can be expanded more than usual so that a customer premise equipment can be coupled to a WRAN base station from outside the usual WRAN service area, to the range that the TV broadcasting service area is not affected. In particular, in the case where the customer premise equipment is portable and moves out of the usual WRAN service area, the customer premise equipment can hold communication to/from a base station without affecting a primary system such as a TV station.

Second Embodiment

A second embodiment of this invention is described next.

The distances d1, d2, and ds in the first embodiment are calculated with the use of information held in the location database 2306 (FIG. 3) within the WRAN customer premise equipment 1102. In the second embodiment, d1, d2, and ds are calculated in a case where the WRAN customer premise equipment 1102 does not have a location database. A concrete description is given below on a method of calculating d1, d2, and ds.

In a case where the WRAN customer premise equipment 1102 does not have a location database, the WRAN customer premise equipment 1102 does not know the location of the TV station 201 and the location of the WRAN base station 1101. Accordingly, the receiving power is measured through sensing at a frequency in question as illustrated in FIG. 8, and the propagation properties (attenuation characteristics with respect to distance) of the relevant frequency band are used to estimate the differential distance (d2−d1) and the distance ds of the service area of the WRAN base station 1101. The differential distance (d2−d1) is the difference of the distance d1 between the TV station 201 and the farthest point where TV broadcasting can be received from the distance d2 between the TV station 201 and the WRAN customer premise equipment 1102.

A concrete description of this calculation method is given blow.

The frequency of radio waves from the WRAN base station 1101 is the same as the frequency of TV broadcasting radio waves. It is therefore necessary to recognize which of the transmitters has transmitted a signal whose receiving power has been sensed in sensing. In addition, radio waves of TV broadcasting are transmitted continuously (2801). Further, the quiet period 2803 is provided in a wireless system of this embodiment in order to detect other systems than the primary system and WRANs, and signals are transmitted intermittently (2802).

Accordingly, sensing is executed in the quiet period to compare a sensing result (Rx_quiet) 2805 within the quiet period with a sensing result (Rx_nonquiet) 2804 outside the quiet period.

In the case where a received signal that has been sensed by sensing at the frequency in question is of TV broadcasting, the sensing result (Rx_quiet) 2805 within the quiet period is substantially equal to the sensing result (Rx_nonquiet) 2804 outside the quiet period (see Expression 9).

Rx_quiet≈Rx_nonquiet   Expression 9

In the case where a received signal that has been sensed by sensing at the frequency in question is multiplexed with a signal from the WRAN base station 1101, on the other hand, the sensing result (Rx_quiet) 2805 within the quiet period is smaller than the sensing result (Rx_nonquiet) 2804 outside the quiet period (see Expression 10).

Rx_quiet<Rx_nonquiet   Expression 10

Whether or not a sensed signal is a signal from the WRAN base station 1101 can be determined by the magnitude relation between the sensing result (Rx_quiet) within the quiet period and the sensing result (Rx_nonquiet) outside the quiet period.

The method of calculating a distance has been described in the first embodiment: in a case where the Tx power is given as Tx and the propagation properties P of the frequency in question are expressed by a function that has distance as a parameter, the receiving power is expressed by Expression 1 and a distance is calculated by Expression 12. In Expression 12, $P^{-1}(x)$ is an inverse function of $P(x)$.

(Receiving power Rx)=Tx×P(distance)   Expression 11

Distance=$P^{-1}$(Rx/Tx)   Expression 12

The distance ds can be calculated by obtaining Tx through reference to a database within the WRAN customer premise equipment 1102 and measuring the receiving power Rx of a wanted signal through sensing.

Similarly, in a case where the location of the TV station 201 is unknown, or in a case where the location of the TV station 201 is not held in the database within the WRAN customer premise equipment 1102, if the WRAN customer premise equipment 1102 maintains a receiving sensitivity capable of receiving TV broadcasting (TVs [dBm]), the distance (d2−d1) is calculated by Expression 13 with the use of the receiving power (Rx [dBm]) of a wanted signal sensed through sensing within the quiet period of the frequency in question, and the propagation properties in the relevant frequency band.

$d2-d1=P^{-1}$(Rx/Tx)$-P^{-1}$(TVs/Tx)   Expression 13

In a case where the WRAN customer premise equipment 1102 moves out of the service area, the WRAN customer premise equipment 1102 may not be able to grasp the quiet period 2803 in the WRAN system accurately. However, because the quiet period 2803 is provided cyclically, it is sufficient if changes in receiving power are measured over a period equal to or longer than the quiet period defined in WRAN, periodic fluctuations of the overall receiving power (2806 in FIG. 19) are detected to identify the quiet period 2803, and then sensing is executed within the quiet period and outside the quiet period.

The configurations of the respective nodes and the rest of the processes in the second embodiment are the same as those in the first embodiment described above, and detailed descriptions thereof are omitted here.

As has been described, according to the second embodiment of this invention, a WRAN service area can be expanded more than usual so that a customer premise equipment can be coupled to a WRAN base station from outside the usual WRAN service area, to the range that the TV broadcasting service area is not affected, even if the WRAN customer premise equipment 1102 does not have a location database (the location of the WRAN base station 1101 and the location of the TV station 201).

Third Embodiment

A third embodiment of this invention is described next.

A power-up request transmitted from the WRAN customer premise equipment 1102 is a signal having a specific pattern in the first embodiment described above. The third embodiment differs from the first embodiment in that a power-up request transmitted to the WRAN base station 1101 is not a simple signal and is given a message format by adding detailed information of the WRAN customer premise equipment 1102 to the specific pattern.

Figure 20:
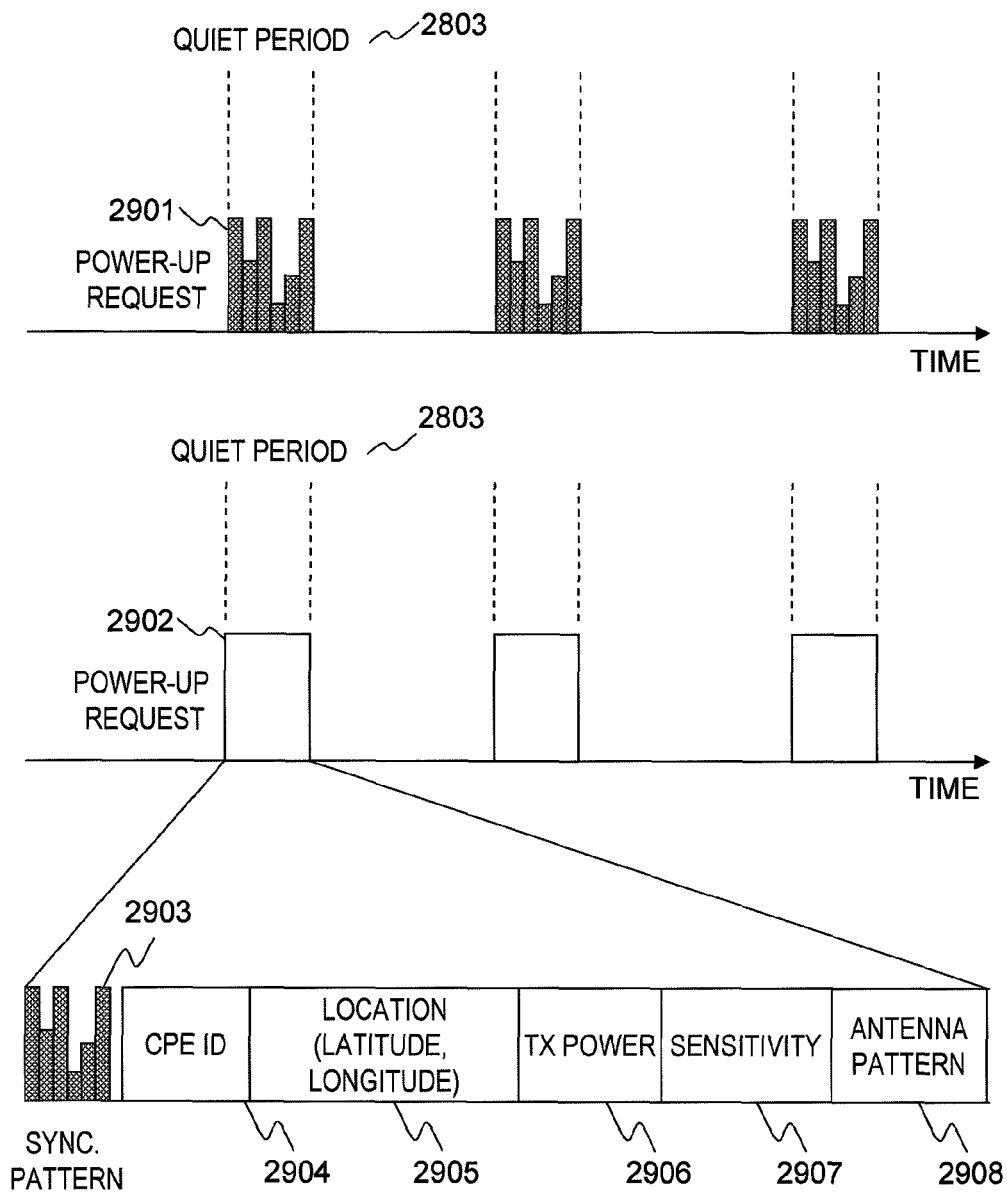
FIG. 20 is an explanatory diagram illustrating an example of a power-up request signal of a third embodiment.
Figure 21:
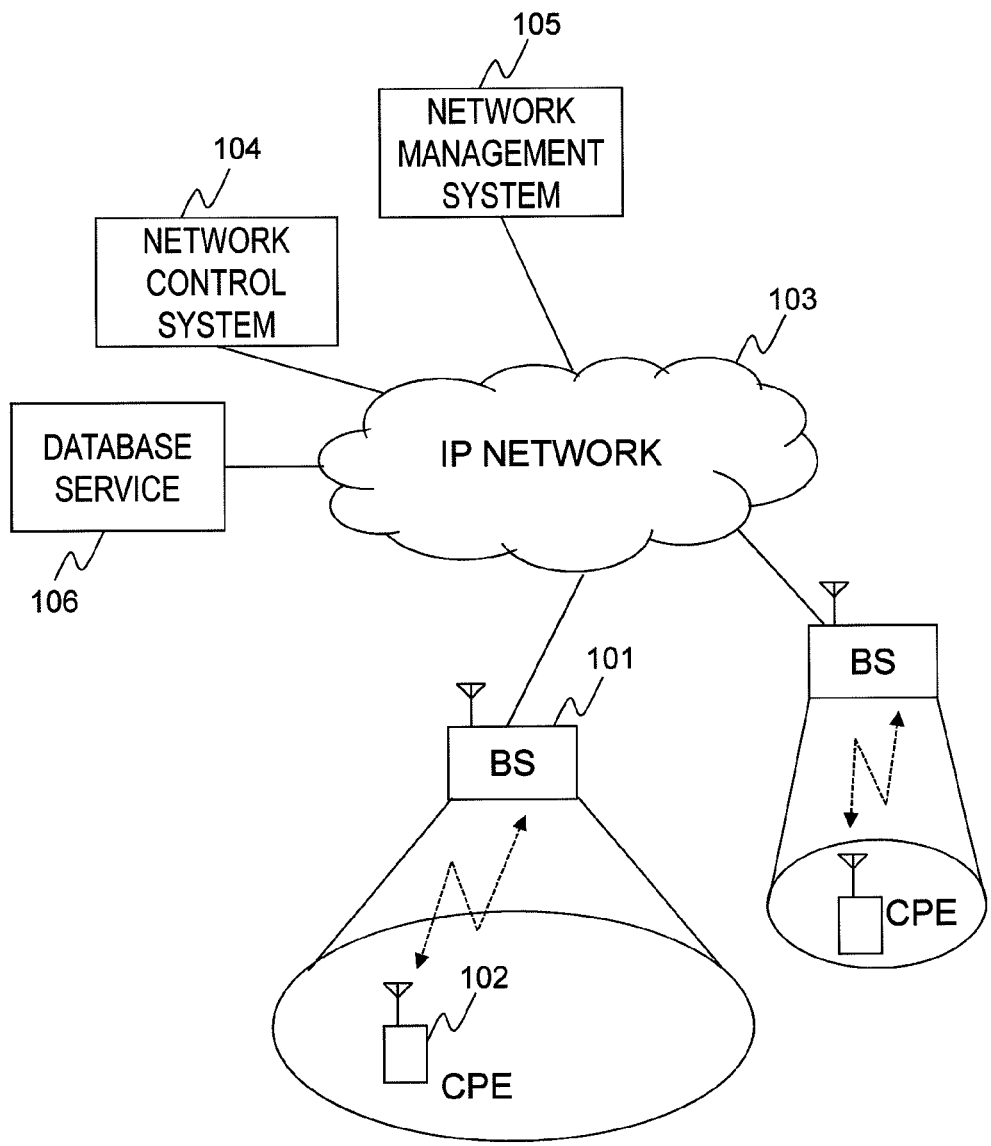
FIG. 21 is a diagram illustrating a configuration of a wireless communication system which conforms to the draft specifications of IEEE 802.22.
Figure 22:
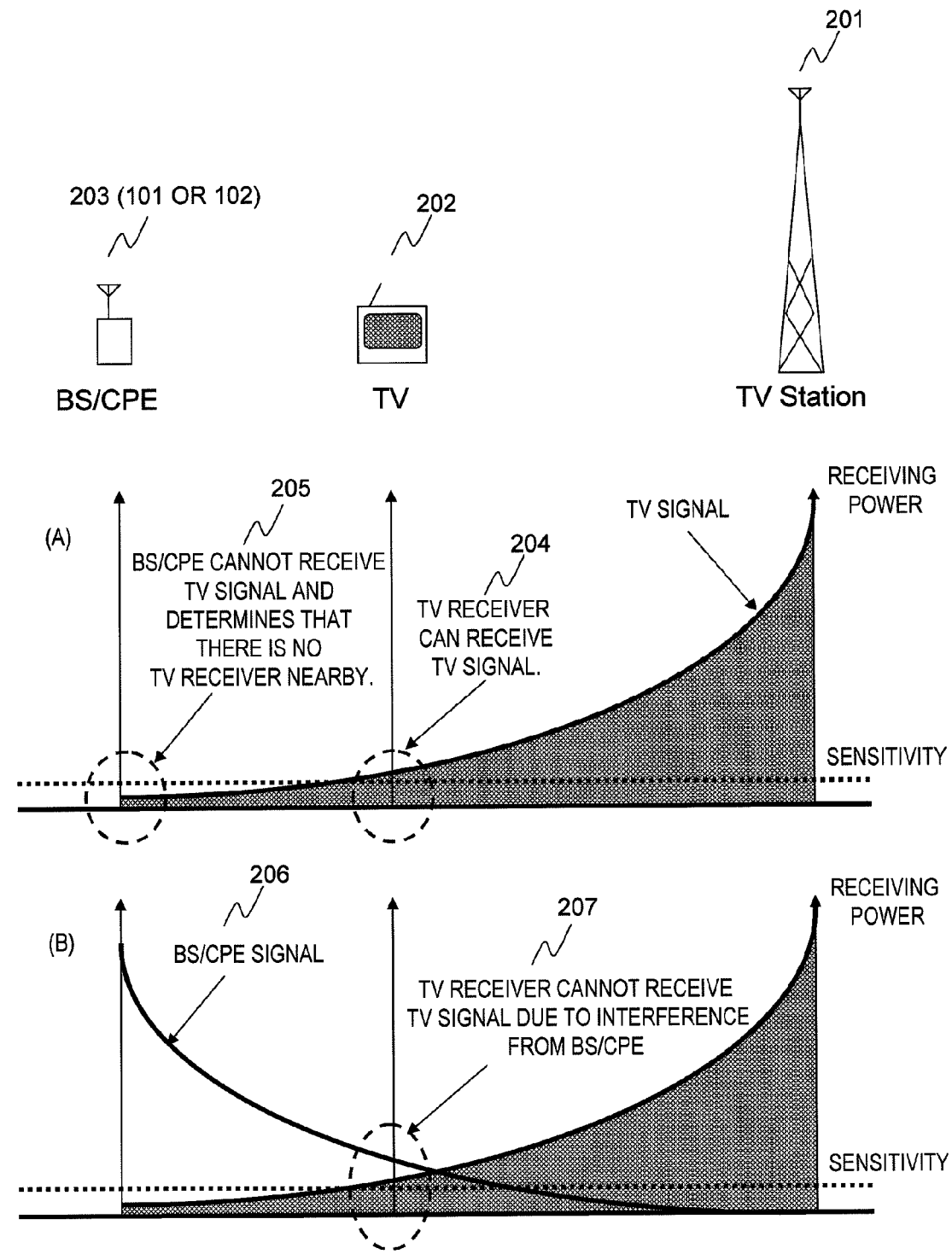
FIG. 22 is an explanatory diagram illustrating "hidden node problem" of a wireless communication system of prior art.
Figure 23:
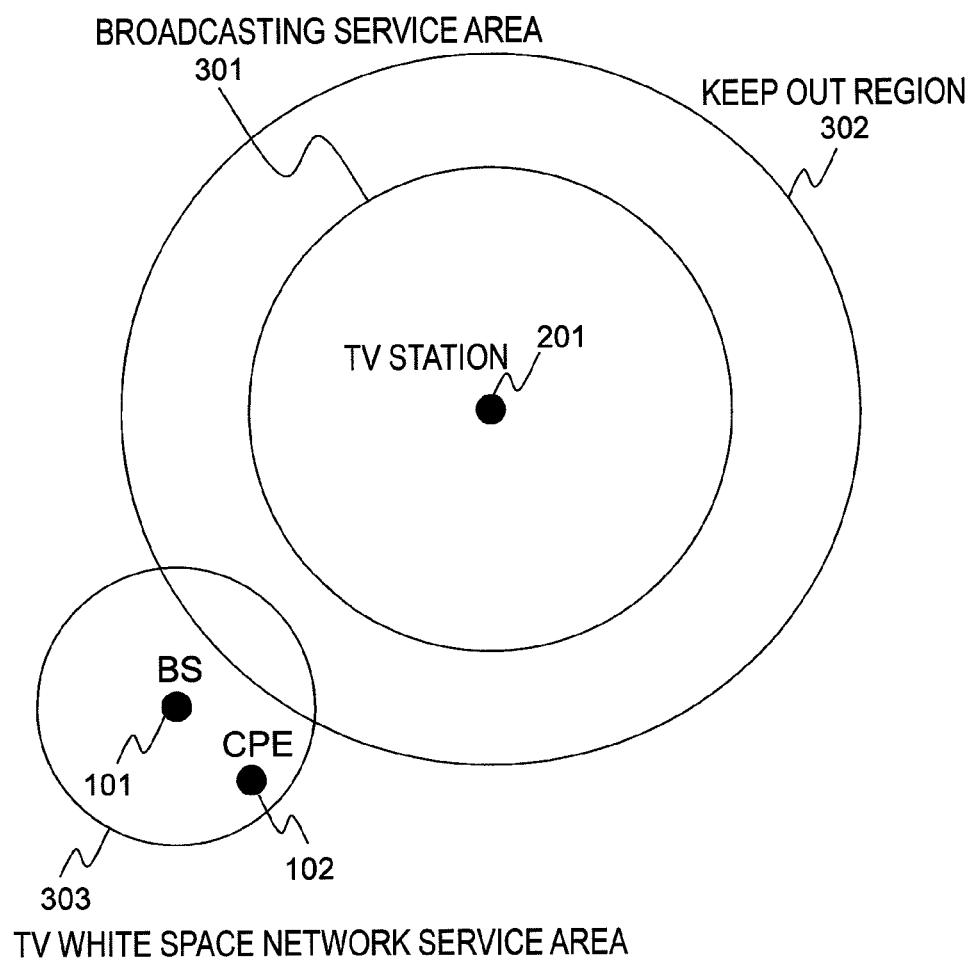
FIG. 23 is an explanatory diagram illustrating a service area of a WRAN system of prior art.

FIG. 20 illustrates an example of a power-up request signal 2901 which is transmitted in a quiet period. The power-up request signal 2901 in this example has a specific pattern in the time direction. The power-up request signal 2901 may instead have a specific pattern in the frequency direction. The power-up request signal 2901 needs to have a specific pattern common to the WRAN customer premise equipment 1102 and the WRAN base station 1101, and no other types of information are added thereto. However, in the case where this specific pattern is transmitted from a plurality of WRAN customer premise equipments 1102 concurrently, it is difficult to identify which WRAN customer premise equipment 1102 has transmitted the power-up request signal 2901. The WRAN customer premise equipment 1102 in the third embodiment therefore transmits a power-up request message 2902.

The power-up request message 2902 contains a synchronization pattern 2903 by which the message can be identified uniquely as a power-up request, an ID 2904 of the WRAN customer premise equipment 1102 from which this request is transmitted, a location 2905 of the WRAN customer premise equipment 1102, a Tx power 2906 of the WRAN customer premise equipment 1102, a receiving sensitivity 2907 of the WRAN customer premise equipment 1102, and an antenna pattern 2908 of the WRAN customer premise equipment 1102.

Of the information contained in the power-up request message 2902, the ID 2904 of the WRAN customer premise equipment 1102 and the location 2905 of the WRAN customer premise equipment 1102 are mandatory information, whereas the Tx power 2906 of the WRAN customer premise equipment 1102, the receiving sensitivity 2907 of the WRAN customer premise equipment 1102, and the antenna pattern 2908 of the WRAN customer premise equipment 1102 are voluntary information. Including the antenna pattern 2908 in the power-up request message 2902 particularly enhances accuracy in calculating the Tx power of the WRAN base station 1101.

As has been described, according to the third embodiment where the WRAN customer premise equipment includes information of the WRAN customer premise equipment 1102 in a power-up request signal to be transmitted, the Tx power at the WRAN base station can be calculated with an enhanced accuracy.

The description of the third embodiment given above focuses on the format of the power-up request signal. The configurations of the respective nodes and the rest of the processes in the third embodiment are the same as those in the first embodiment and second embodiment described above, and detailed descriptions thereof are omitted here.

A wireless communication system may be built by combining the third embodiment and the second embodiment.

While systems that utilize a TV white space have been described as one embodiment of this invention, this invention can be applied to any wireless communication system in which one frequency is shared that is desired to be run without affecting other systems.

While the present invention has been described in detail and pictorially in the accompanying drawings, the present invention is not limited to such detail but covers various obvious modifications and equivalent arrangements, which fall within the purview of the appended claims.

What is claimed is:

1. A wireless communication system, which secondarily uses same frequency as a primary system that uses a certain frequency,
the wireless communication system comprising:
a mobile terminal; and
a base station,
wherein the mobile terminal is configured to:
detect a signal having the frequency; and
request, in a case where a broadcast signal transmitted from the base station is undetectable, the base station to increase a transmission power to a range that the signal does not reach a service area of the primary system, based on a location of a wireless transmitter of the primary system, a location of the base station of the wireless communication system, and a location of the mobile terminal of the wireless communication system, and
wherein the base station increases the transmission power to the range that the signal does not reach the service area of the primary system in case of receiving the request to increase the transmission power.

2. The wireless communication system according to claim 1, wherein the mobile terminal is configured to obtain location information of the mobile terminal before detecting a utilization status of the frequency.

3. The wireless communication system according to claim 1, wherein the mobile terminal is configured to hold information about the location of the base station that is a candidate for a node to which the mobile terminal is to be coupled, receiving sensitivity of the wireless communication system, the location of the wireless transmitter of the primary system that is in surroundings of the mobile terminal, and the receiving sensitivity of the primary system.

4. The wireless communication system according to claim 1, wherein the mobile terminal is configured to:
detect a signal of the primary system and a signal of the secondary wireless communication system which is transmitted in different timing from that of the signal of the primary system; and
calculate a distance between the wireless transmitter of the primary system and the mobile terminal, a distance between the base station and the mobile terminal, and a distance from a boundary of the service area of the primary system to the mobile terminal based on results of the sensing.

5. The wireless communication system according to claim 1, wherein the mobile terminal is configured to request the base station to increase the transmission power by transmitting a signal that has a given pattern in timing on when the wireless communication system does not transmit a signal.

6. The wireless communication system according to claim 5, wherein, the base station increases the transmission power in a case where the signal having the given pattern which is transmitted from the mobile terminal is detected in the timing on when the wireless communication system does not transmit a signal.

7. The wireless communication system according to claim 1, wherein the mobile terminal is configured to:
determine antenna directivity in a direction in which a signal does not reach the service area of the primary system, and determine the transmission power that does not allow the signal to reach the service area of the primary system based on a positional relation of the mobile terminal and the wireless transmitter of the primary system; and
transmit the signal to the base station in a case where it is determined that the signal reaches the base station under the determined conditions.

8. The wireless communication system according to claim 1,
wherein the primary system has a keep out region set at a given distance from the service area in which a signal from the wireless transmitter reaches, outside the service area, and
wherein the mobile terminal is configured to:
determine antenna directivity in a direction in which a signal does not reach the service area of the primary system, and determine the transmission power that does not allow the signal to reach the service area of the primary system, based on a positional relation of the mobile terminal and the wireless transmitter of the primary system in a case where a distance between the base station that is a coupling candidate and the mobile terminal is equal to or more than the given distance which defines the keep out region, and a broadcast signal transmitted from the base station that is the coupling candidate is undetectable; and
request the base station to increase the transmission power by transmitting a signal that has a given pattern in a time period where the wireless communication system does not transmit a signal in a case where it is determined that the signal reaches the base station under the determined conditions.

9. The wireless communication system according to claim 8, wherein, the base station increases the transmission power in a case where the signal including the given pattern which is transmitted from the mobile terminal is detected in the timing on when the wireless communication system does not transmit a signal.

10. The wireless communication system according to claim 1, further comprising a database for holding information about the location of the wireless transmitter of the primary system, a transmission power of the wireless transmitter of the primary system, an antenna pattern of the primary system, and receiving sensitivity of the primary system, and information about a signal utilization status of each frequency at a location of each base station.

11. The wireless communication system according to claim 10,
wherein the database periodically obtains a signal status of each frequency from the base station by setting up a sensing trigger in the base station, and updates the held information based on the obtained signal status.

12. A mobile terminal for a wireless communication system, which secondarily uses same frequency as a primary system that uses a certain frequency, the mobile terminal comprising:
a sensing block for detecting a signal transferred at frequency; and
a power increase request block for requesting, in a case where a broadcast signal transmitted from a base station of the wireless communication system is undetectable, the base station to increase a transmission power to a range that the signal does not reach a service area of the primary system, based on a location of a wireless transmitter of the primary system, a location of the base station of the wireless communication system, and a location of the mobile terminal of the wireless communication system.

13. The mobile terminal according to claim 12, further comprising a location information acquisition block for obtaining location information of the mobile terminal before detecting a utilization status of the frequency.

14. The mobile terminal according to claim 12, further comprising a database for holding information about the location of the base station that is a candidate for a node to which the mobile terminal is to be coupled, receiving sensitivity of the wireless communication system, the location of the wireless transmitter of the primary system that is in surroundings of the mobile terminal, and the receiving sensitivity of the primary system.

15. The mobile terminal according to claim 12,
wherein the sensing block detects a signal of the primary system and a signal of the secondary wireless communication system which is transmitted in different timing from that of the signal of the primary system, and
wherein the mobile terminal further comprises a distance calculation block for calculating a distance between the wireless transmitter of the primary system and the mobile terminal, a distance between the base station and the mobile terminal, and a distance from a boundary of the service area of the primary system to the mobile terminal based on results of the sensing.

16. The mobile terminal according to claim 12, wherein the power increase request block requests the base station to increase the transmission power by transmitting a signal that has a given pattern in timing on when the wireless communication system does not transmit a signal.

17. The mobile terminal according to claim 12, wherein the power increase request block
determines antenna directivity in a direction in which a signal does not reach the service area of the primary system, and determine the transmission power that does not allow the signal to reach the service area of the primary system based on a positional relation of the mobile terminal and the wireless transmitter of the primary system, and
transmits the signal to the base station in a case where it is determined that the signal reaches the base station under the determined conditions.

18. The mobile terminal according to claim 12,
wherein the primary system has a keep out region set at a given distance from the service area in which a signal from the wireless transmitter reaches, outside the service area, and
wherein the power increase request block determines antenna directivity in a direction in which a signal does not reach the service area of the primary system, and determine the transmission power that does not allow the signal to reach the service area of the primary system, based on a positional relation of the mobile terminal and the wireless transmitter of the primary system in a case where a distance between the base station that is a coupling candidate and the mobile terminal is equal to or more than the given distance which defines the keep out region, and a broadcast signal transmitted from the base station that is the coupling candidate is undetectable; and request the base station to increase the transmission power by transmitting a signal that has a given pattern in a time period where the wireless communication system does not transmit a signal in a case where it is determined that the signal reaches the base station under the determined conditions.

19. A base station for a wireless communication system, which secondarily uses same frequency as a primary system that uses a certain frequency, the wireless communication system being configured to, when a mobile terminal requests, in a case where a broadcast signal transmitted from the base station is undetectable, the base station to increase a transmission power to a range that the broadcast signal does not reach a service area of the primary system, based on a location of a wireless transmitter of the primary system, a location of the base station of the wireless communication system, and a location of the mobile terminal of the wireless communication system, and increase the transmission power to the range that the signal does not reach the service area of the primary system in a case where receiving the request to increase the transmission power.

20. The base station according to claim 19, wherein, the base station increases the transmission power in a case of detecting the request to increase the transmission power, the request being made by transmitting a signal having a given pattern which is transmitted from the mobile terminal in timing on when the wireless communication system does not transmit a signal.

* * * * *